United States Patent
Miyoshi et al.

(10) Patent No.: US 9,416,198 B2
(45) Date of Patent: *Aug. 16, 2016

(54) METHOD FOR PRODUCING ALKALI CELLULOSE

(75) Inventors: Eisuke Miyoshi, Wakayama (JP); Yutaka Yoshida, Wakayama (JP); Ryo Miyasato, Wakayama (JP); Yoichiro Imori, Wakayama (JP); Toru Nishioka, Wakayama (JP)

(73) Assignee: KAO CORPORATION, Tokyo (JP)

( * ) Notice: Subject to any disclaimer, the term of this patent is extended or adjusted under 35 U.S.C. 154(b) by 145 days.

This patent is subject to a terminal disclaimer.

(21) Appl. No.: 14/115,252

(22) PCT Filed: Apr. 27, 2012

(86) PCT No.: PCT/JP2012/061477
§ 371 (c)(1),
(2), (4) Date: Nov. 1, 2013

(87) PCT Pub. No.: WO2012/150701
PCT Pub. Date: Nov. 8, 2012

(65) Prior Publication Data
US 2014/0073777 A1 Mar. 13, 2014

(30) Foreign Application Priority Data
May 2, 2011 (JP) ................................ 2011-103311

(51) Int. Cl.
| | | |
|---|---|---|
| C08B 15/00 | (2006.01) | |
| C08B 1/06 | (2006.01) | |
| C08B 1/08 | (2006.01) | |
| C08B 11/08 | (2006.01) | |
| C08B 11/00 | (2006.01) | |
| C08B 11/02 | (2006.01) | |
| C08B 11/06 | (2006.01) | |
| C08B 11/12 | (2006.01) | |
| C08B 11/14 | (2006.01) | |
| C08B 11/20 | (2006.01) | |
| C08H 8/00 | (2010.01) | |
| D21C 9/00 | (2006.01) | |

(52) U.S. Cl.
CPC ... C08B 1/08 (2013.01); C08B 1/06 (2013.01); C08B 11/00 (2013.01); C08B 11/02 (2013.01); C08B 11/06 (2013.01); C08B 11/08 (2013.01); C08B 11/12 (2013.01); C08B 11/14 (2013.01); C08B 11/20 (2013.01); C08H 8/00 (2013.01); D21C 9/004 (2013.01); D21C 9/007 (2013.01)

(58) Field of Classification Search
None
See application file for complete search history.

(56) References Cited

U.S. PATENT DOCUMENTS

| | | |
|---|---|---|
| 2008/0242852 A1 | 10/2008 | Kim et al. |
| 2010/0105891 A1 | 4/2010 | Nojiri et al. |
| 2010/0274001 A1 | 10/2010 | Okutsu et al. |
| 2010/0311964 A1 | 12/2010 | Okutsu et al. |
| 2011/0282050 A1 | 11/2011 | Merz et al. |

FOREIGN PATENT DOCUMENTS

| | | |
|---|---|---|
| JP | 38-4800 B | 4/1963 |
| JP | 2009-102587 A | 5/2009 |
| JP | 2009-114375 A | 5/2009 |
| JP | 2009-522394 A | 6/2009 |
| JP | 2009-161717 A | 7/2009 |
| JP | 2011-37924 A | 2/2011 |
| WO | 2009/063856 A1 | 5/2009 |

OTHER PUBLICATIONS definition of "Cellulose", CHEMnetBASE, http://poly.chemnetbase.com/entry.do?id=3419&exno=3419&method=view&si=POLY; last viewed Sep. 3, 2015.*
Chinese Office Action, dated Apr. 20, 2015, for Chinese Application No. 201280020991.9.
Gao et al., "Science of Cellulose", Science Press, first edition, May 31, 1999, pp. 206-209 and English translation thereof.
U.S. Appl. No. 14/115,212, Nov. 1, 2013.

* cited by examiner

Primary Examiner — Layla Berry
Assistant Examiner — Bahar Craigo
(74) Attorney, Agent, or Firm — Birch, Stewart, Kolasch & Birch, LLP

(57) ABSTRACT

The present invention relates to a method for producing an alkali cellulose with suppressed decrease in the degree of polymerization as well as with small use amount of a basic compound, and to a method for producing a cellulose ether by using the alkali cellulose thus obtained. Provided by the present invention are: (A) a method for producing an alkali cellulose, comprising Step 1 wherein a cellulose-containing raw material (I) is treated by a pulverizing machine thereby obtaining a cellulose-containing raw material (II) which contains a cellulose having crystallinity in the range of 10 to 55% and Step 2 wherein the cellulose-containing raw material (II) obtained in Step 1 is added by a basic compound with the amount thereof being in the range of 0.6 to 1.5 mol relative to 1 mol of an anhydroglucose unit that constitutes the said cellulose as well as by water with the amount thereof being in the range of 20 to 100% by mass relative to the said cellulose thereby obtaining the alkali cellulose; and (B) a method for producing a cellulose ether by reacting the alkali cellulose produced by the foregoing production method with an etherification agent.

15 Claims, 1 Drawing Sheet

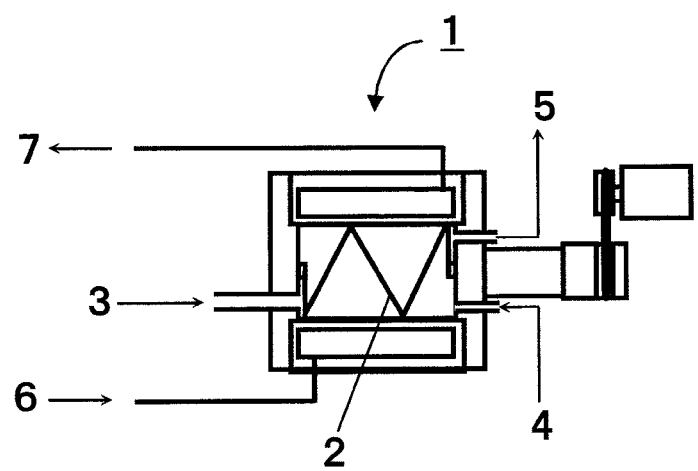

METHOD FOR PRODUCING ALKALI CELLULOSE

TECHNICAL FIELD

The present invention relates to a method for producing an alkali cellulose and to a method for producing a cellulose ether.

BACKGROUND ART

A cellulose ether is widely used as an ingredient for cleaning compositions such as a shampoo, a rinse, a treatment, and a conditioner, as well as a dispersing agent, a modifier, a flocculant, and so forth. A cellulose that is a raw material for producing cellulose ether is highly crystalline with poor reactivity, so that it is necessary to lower its crystallinity and improve its reactivity in production of the cellulose ether.

Accordingly, in a generally used production method of the cellulose ether, a cellulose is activated by a so-called alcell process or mercerization process in which a cellulose, a large quantity of water, and a large excess of an alkaline metal hydroxide are mixed as a slurry state of them to form an alkali cellulose, which is then subjected to an etherification reaction.

However, in this method, a large quantity of salt is by-produced from this large excess of the alkaline metal hydroxide used in the alcell process; and thus, the purification burden to remove this by-produced salt becomes a problem. Accordingly, methods for producing an alkali cellulose or a cellulose derivative with which the amount of the alkaline metal hydroxide is aimed to be reduced have been proposed.

For example, in Patent Document 1, a method for producing an alkali cellulose wherein a sodium hydroxide solution having a comparatively high concentration of 30 to 70% is supplied by spraying it as a mist to a pulp having the size of 60 to 80 mesh thereby effecting mixing and reacting them is disclosed.

In Patent Document 2, a method for producing an alkali cellulose wherein an alkali-substitution is done effectively by a mechanical treatment in the presence of a basic compound and water thereby having the substituent group uniformly dispersed is disclosed.

In Patent Document 3, a method for producing a cellulose derivative wherein a powder cellulose with low crystallinity is reacted with glycidol in the presence of a catalyst is disclosed.

In Patent Document 4, a method for produce a cationized cellulose wherein a powder cellulose with low crystallinity is reacted with a glycidyl trialkyl ammonium salt in the presence of a catalyst is disclosed.

In Patent Document 5, a method for producing a hydroxyalkylalkyl cellulose, wherein a pulp is treated with an alkaline metal hydroxide after the pulp is finely pulverized, and then it is reacted with an alkyleneoxide and a halogenated alkyl, is disclosed.

Patent Document 1: Japanese Patent Application Publication No. S38-4800
Patent Document 2: Japanese Patent Laid-Open Publication No. 2011-37924
Patent Document 3: Japanese Patent Laid-Open Publication No. 2009-114375
Patent Document 4: Japanese Patent Laid-Open Publication No. 2009-102587
Patent Document 5: Japanese Patent Application Laid-Open No. 2009-522394

SUMMARY OF THE INVENTION

The present invention relates to the following (A) and (B).
(A) A method for producing an alkali cellulose comprising the following Step 1 and Step 2.
Step 1: A cellulose-containing raw material (I) is treated by a pulverizing machine thereby obtaining a cellulose-containing raw material (II) which contains a cellulose having crystallinity in the range of 10 to 55%.
Step 2: The cellulose-containing raw material (II) obtained in Step 1 is added by a basic compound with the amount thereof being in the range of 0.6 to 1.5 mol relative to 1 mol of an anhydroglucose unit that constitutes the said cellulose as well as by water with the amount thereof being in the range of 20 to 100% by mass relative to the said cellulose thereby obtaining an alkali cellulose.
(B) A method for producing a cellulose ether, wherein the alkali cellulose produced by the production method according to (A) is reacted with an etherification agent.

BRIEF DESCRIPTION OF THE DRAWING

FIG. 1 shows a schematic drawing of a reactor part of the ribbon mixer type reacting apparatus used in le 16.

MODE FOR CARRYING OUT THE INVENTION

The method of Patent Document 1 intends to reduce the amount of a large excess of an alkaline metal hydroxide used in the alcell process; but its effect is insufficient.

In the methods of Patent Documents 2, 3, and 4, although the use amount of a metal hydroxide could be reduced during the alcell process, it became apparent that there is a problem of decrease in the degree of polymerization of the cellulose during the time of easing the cellulose crystal structure.

In the method of Patent Document 5, the aim thereof is to produce a cellulose derivative without producing much of wastes; but reduction of the amount of an alkali metal hydroxide used during the alcell process is insufficient.

The present invention relates to a method for producing an alkali cellulose with small decrease in the degree of polymerization of the cellulose as well as with small use amount of a base, and to a method for producing a cellulose ether by using the alkali cellulose thus obtained.

That is, the present invention relates to the following (A) and (B).
(A) A method for producing an alkali cellulose comprising the following Step 1 and Step 2.
Step 1: A cellulose-containing raw material (I) is treated by a pulverizing machine thereby obtaining a cellulose-containing raw material (II) which contains a cellulose having crystallinity in the range of 10 to 55%.
Step 2: The cellulose-containing raw material (II) obtained in Step 1 is added by a basic compound with the amount thereof being in the range of 0.6 to 1.5 mol relative to 1 mol of an anhydroglucose unit that constitutes the said cellulose as well as by water with the amount thereof being in the range of 20 to 100% by mass relative to the said cellulose thereby obtaining an alkali cellulose.
(B) A method for producing a cellulose ether, wherein the alkali cellulose produced by the production method according to (A) is reacted with an etherification agent.

According to the method for producing an alkali cellulose of the present invention, an alkali cellulose can be produced efficiently by using the reduced amount of a basic compound while suppressing decrease in the degree of polymerization of the cellulose. In addition, a cellulose ether can be produced efficiently by using the alkali cellulose thus obtained.

Method for Producing the Alkali Cellulose

The method for producing the alkali cellulose of the present invention comprises the following Step 1 and Step 2.

Step 1: A cellulose-containing raw material (I) is treated by a pulverizing machine thereby obtaining a cellulose-containing raw material (II) which contains a cellulose having crystallinity in the range of 10 to 55%.

Step 2: The cellulose-containing raw material (II) obtained in Step 1 is added by a basic compound with the amount thereof being in the range of 0.6 to 1.5 mol relative to 1 mol of an anhydroglucose unit that constitutes the said cellulose as well as by water with the amount thereof being in the range of 20 to 100% by mass relative to the said cellulose thereby obtaining an alkali cellulose.

Hereinafter, each Step, raw materials to be used, and so forth will be explained in detail.

Step 1

In Step 1, a cellulose-containing raw material (I) is treated by a pulverizing machine thereby obtaining a cellulose-containing raw material (II) which contains a cellulose having crystallinity in the range of 10 to 55%.

Cellulose-containing Raw Material (I):

The cellulose-containing raw material (I) used in the present invention contains an α-cellulose with the amount thereof in the said raw material (I) being preferably 20% or more by mass, more preferably 40% or more by mass, still more preferably 60% or more by mass, or further still more preferably 75% or more by mass. The upper limit of the α-cellulose content is 100% by mass. Meanwhile, the α-cellulose content can be obtained by the following calculation equation (1) by using the alkali-soluble values S10(20° C.) and S18 (20° C.) obtained by ISO 692.

$$\alpha\text{-Cellulose Content(\% by mass)}=100-(S18+S10)/2 \quad (1)$$

In the case of a pulp, the α-cellulose content is generally in the range of 75 to 99% by mass with the rest being, in addition to water, very small amounts of a cellulose of a low degree of polymerization, a hemicellulose, a lignin, and so forth. Content of the cellulose of a low degree of polymerization is very small in a commercially available pulp that is obtained by digesting and bleaching the wooden material; and thus, it can be assumed that in the pulp the cellulose content is almost equal to the α-cellulose content.

The average degree of polymerization of the cellulose in the cellulose-containing raw material (I) (hereinafter this cellulose is sometimes referred to as "raw material (I) cellulose") does not influence the production method of the present invention; and thus, it is not particularly restricted. However, the characteristic of the production method of the present invention resides in that the decrease in the degree of polymerization during the time of producing the alkali cellulose is small, so that the production method of the present invention expresses an eminent effect especially when an alkali cellulose or a cellulose ether having high average degree of polymerization is desired.

In view of this point, the average degree of polymerization of the raw material (I) cellulose is preferably 100 or more, and in view of easiness in its availability preferably 10000 or less. The average degree of polymerization of the raw material (I) cellulose is more preferably in the range of 200 to 5000, still more preferably in the range of 500 to 3000, or further still more preferably in the range of 1000 to 2000.

In the present invention, the average degree of polymerization means the viscosity-average degree of polymerization measured by the copper-ammonia method; and specifically, it is calculated according to the method that is described in EXAMPLES.

The cellulose is composed of the crystalline portion and the amorphous portion, wherein the ratio of the crystalline portion in the raw material (I) cellulose, i.e., the crystallinity, is not particularly restricted. However, the lowering treatment of the cellulose crystallinity is usually accompanied with decrease in the degree of polymerization as a consequence of breakage of the cellulose chain. In order to obtain the alkali cellulose or the cellulose ether having a high average degree of polymerization as mentioned above, the cellulose-containing raw material which contains the cellulose having the degree of polymerization less decreased, that is, having not being subjected to the crystallinity-lowering treatment or, if subjected to the lowering process, the time thereof being short, in other words, the cellulose-containing raw material which contains the cellulose having a high crystallinity, is preferably used. On the other hand, the cellulose-containing raw material having an extremely high crystallinity of more than 95% is not easily available. Accordingly, crystallinity of the raw material (I) cellulose is preferably in the range of 10 to 95%, more preferably in the range of 20 to 95%, still more preferably in the range of 50 to 90%, or even still more preferably in the range of 60 to 80%.

In the present invention, crystallinity of the cellulose means the crystallinity derived from the I-type crystal structure of the raw material (I) cellulose; and it is obtained by the following calculation equation (2) from the result of the X-ray crystal diffraction measurement.

$$\text{Crystallinity(\%)}=\{(I_{22.6}-I_{18.5})/I_{22.6}\}\times 100 \quad (2)$$

(In the equation, $I_{22.6}$ shows the diffraction intensity in the lattice plane (002 plane) of the cellulose I-type crystal in the X-ray diffraction (diffraction angle 2θ=22.6°), and $I_{18.5}$ shows the diffraction intensity of the amorphous portion (diffraction angle 2θ=18.5°).)

There exists also a little bit of the amorphous portion in the commercially available pulp or powder cellulose; and thus, the crystallinity thereof according to the calculation equation (2) is in the range of about 60% to about 80%.

Kind of the cellulose-containing raw material (I) is not particularly restricted. Illustrative example thereof includes various wooden chips; pulps such as a wooden pulp produced from a wooden material and a cotton linter pulp obtained from fibers around the cotton seeds; papers such as a news paper, a carton box, a magazine, and a high quality paper; a plant stem and leaf such as a rice straw and a corn stem; and plant shells such as a rice husk, a palm shell, and a coconut shell. Among them, a pulp is preferable in view of the cellulose purity, the degree of polymerization, and the easy availability.

Form of the cellulose-containing raw material (I) is not particularly restricted so far as there is no problem in charging it into the apparatus to carry out the treatment by a pulverizing machine (this will be mentioned later); but from the operational view point the cellulose-containing raw material in the sheet form, the cellulose-containing raw material in the pellet or chip form obtained by cutting or roughly pulverizing the cellulose-containing raw material in the sheet form, and the cellulose-containing raw material in the powder form obtained by fine pulverization are preferable. Among them, the cellulose-containing raw material in the chip form is preferable in view of the use of the cellulose raw material having a higher degree of polymerization as well as because of the easy operation thereof.

The cellulose-containing raw material in the chip form may be obtained by using a shredder (such as MSX2000-

IVP440F (trade name) manufactured by MEIKO SHOKAI CO., LTD.) or a sheet pelletizer (such as SGG-220 (trade name) manufactured by HORAI CO, LTD.)

Size of the chips of the cellulose-containing raw material in the chip form is preferably in the range of 0.6 to 100 mm square, more preferably in the range of 0.8 to 30 mm square, or still more preferably in the range of 1 to 10 mm square, in view of more efficient treatment of the chips by a pulverizing machine. By cutting or roughly pulverizing the cellulose-containing raw material in the chip form to the size within the range as mentioned above, the drying operation that may be done as necessary can be done efficiently, and in addition, the load during the treatment by a pulverizing machine can be reduced.

Water content in the cellulose-containing raw material (I) is preferably 10% or less by mass relative to the raw material (I) cellulose from the view point of the lowering efficiency of the crystallinity during the treatment by a pulverizing machine which will be mentioned later. From this view point, water content in the cellulose-containing raw material (I) is preferably 7% or less by mass, or more preferably 5% or less by mass, relative to the raw material (I) cellulose. The lower limit of the water content is 0% by mass relative to the raw material (I) cellulose; however, because it is difficult to achieve the water content of 0% by mass in the cellulose-containing raw material, the water content therein is preferably 0.01% or more by mass, more preferably 0.1% or more by mass, or still more preferably 0.5% or more by mass, relative to the raw material (I) cellulose. Furthermore, in view of the above mentioned, the water content in the cellulose-containing raw material (I) is preferably in the range of 0.01 to 10% by mass, more preferably in the range of 0.1 to 7% by mass, or still more preferably in the range of 0.5 to 5% by mass, relative to the raw material (I) cellulose. If the water content in the cellulose-containing raw material (I) is more than the foregoing range, it is preferable to adjust the water content within the foregoing range of the water content by carrying out a heretofore known drying operation prior to the treatment by a pulverizing machine.

Water content in the cellulose-containing raw material may be measured by using a commercially available infrared moisture determination balance and specifically, the measurement thereof can be done by the method described in EXAMPLES.

Treatment by a Pulverizing Machine:

In the present invention, the treatment by a pulverizing machine means the treatment by which the crystallinity of the raw material (I) cellulose is lowered by means of an impact, a slip, a shear, or a pressure by using a pulverization machine; and this is distinguished from the chemical treatment to lower the crystallinity such as dissolution or swelling by a solvent or the like and the alcell process by addition of a basic compound. However, this does not exclude the effect to lower the crystallinity of the cellulose by a heat, a sound, and the like accompanied with the pulverization treatment to lower the crystallinity; and thus, this includes the case that the crystallinity of the cellulose is influenced by these effects of a heat, a sound, and the like, in addition to a main mechanical force.

Specific example of the pulverizing machine used in the treatment by a pulverizing machine includes roll mills such as a high pressure compression roll mill and a roll rotation mill; vertical roller mills such as a ring roller mill, a roller race mill, and a ball race mill; vessel-driven medium mills such as a rolling ball mill, a vibrating ball mill, a vibrating rod mill, a vibrating tube mill, a planetary ball mill, and a centrifugally fluidizing mill; medium-stirring mills such as a tower pulverizing machine, a stirring tank mill, a through-flow tank mill, and an annular mill; compressing shear mills such as a high-speed centrifugal roller mill and an angmill; and a stone mill and a masscolloider. Among them, in view of productivity as well as the lowering efficiency of crystallinity of the raw material (I) cellulose, vessel-driven medium mills and medium-stirring mills are preferable; especially vessel-driven medium mills are preferable; vibrating mills such as a vibrating ball mill, a vibrating rod mill, and a vibrating tube mill are still more preferable; and a vibrating rod mill is further still more preferable.

As to the method for treatment by a pulverizing machine, pulverization may be done any of a batch-wise method and a continuous method.

Material of the apparatus and/or the medium used in the treatment by a pulverizing machine is not particularly restricted; and illustrative example thereof includes iron, stainless steel, alumina, zirconia, silicon carbide, silicon nitride, and glass. From the view point of the lowering efficiency of the crystallinity, iron, stainless steel, zirconia, silicon carbide, and silicon nitride are preferable; and in view of the industrial applicability, iron and stainless steel are more preferable.

From the view point of the lowering efficiency of the crystallinity, when the apparatus is a vibrating mill in which the medium thereof is a rod, the outer diameter of the rod is preferably in the range of 0.1 to 100 mm, or more preferably in the range of 0.5 to 50 mm. If size of the rod is within the foregoing range, lowering of the crystallinity to the intended value can be done efficiently; and in addition, there is no fear of contamination of the cellulose as a consequence of mixing of a spall and the like of the rod.

Preferable range of the filling ratio of the rod is different depending on the kind of the vibrating mill, but it is preferably in the range of 10 to 97%, or more preferably in the range of 15 to 95%. If the filling ratio is within this range, contact frequency of the cellulose-containing raw material (I) with the rod is increased, and in addition, the lowering efficiency of the crystallinity can be enhanced without encumbering movement of the medium. Here, the filling ratio means an apparent volume of the rod relative to the volume of the stirring part of the vessel in the vibrating mill.

The treatment by a pulverizing machine is carried out until crystallinity of the raw material (I) cellulose reaches the range of 10 to 55%. Owing to this treatment by a pulverizing machine, the cellulose-containing raw material (II) which contains the cellulose whose crystallinity is in the range of 10 to 55% can be obtained (hereinafter, this is sometimes referred to as merely "cellulose-containing raw material (II)").

If crystallinity of the cellulose in the cellulose-containing raw material (II) (hereinafter, this cellulose is sometimes referred to as "raw material (II) cellulose") is 55% or less, the alkali cellulose can be produced in high yield even if use amount of a basic compound used in Step 2 is as small as in the range of 0.6 to 1.5 mol relative to 1 mol of an anhydroglucose unit (hereinafter, this unit is sometimes referred to as "AGU") that constitutes the cellulose skeleton of the raw material (II) cellulose used in Step 2. From this view point, crystallinity of the raw material (II) cellulose after the treatment by a pulverizing machine is preferably 52% or less, more preferably 50% or less, still more preferably 40% or less, or further still more preferably 30% or less. On the other hand, if the crystallinity is 10% or more, decrease in the degree of polymerization of the raw material (II) cellulose from the raw material (I) cellulose is small. From this view point, crystallinity of the raw material (II) cellulose after the treatment by a pulverizing machine is preferably 11% or more, more preferably 12% or more, or still more preferably 15% or more. To obtain the alkali cellulose having high degree of polymerization in high yield by reducing the use amount of a basic compound, crystallinity of the raw material (II) cellulose is preferably in the range of 10 to 52%, more preferably in the range of 10 to 50%, still more preferably in the range of 11 to 40%, further still more preferably in the range of 12 to 40%, or even further still more preferably in the range of 15 to 30%.

Meanwhile, amount of the cellulose does not change substantially before and after the treatment by a pulverizing machine; and thus, the amount of the raw material (I) cellulose is approximately the same as the amount of the raw material (II) cellulose in Step 1.

Temperature during the treatment by a pulverizing machine is not particularly restricted; but in view of operational cost and suppression of the decrease in the degree of polymerization of the raw material (I) cellulose, the temperature is preferably in the range of −100 to 200° C., more preferably in the range of 0 to 100° C., or still more preferably in the range of 30 to 70° C.

Time for the treatment by a pulverizing machine may be adjusted appropriately such that crystallinity of the raw material (II) cellulose may become the intended value. Time for the treatment by a pulverizing machine is different depending on the used pulverizing machine, the used energy amount, and so forth; but the time is usually in the range of 1 minute to 12 hours. In view of lowering amount of the crystallinity from the raw material (I) cellulose as well as suppression of the decrease in the degree of polymerization of the raw material (I) cellulose, the time is preferably in the range of 5 minutes to 3 hours, more preferably in the range of 8 minutes to 1 hour, or still more preferably in the range of 10 to 30 minutes.

During the treatment by a pulverizing machine, the treatment is carried out preferably under an atmosphere of an inert gas such as nitrogen as appropriate in view of avoiding coloration and decrease in the degree of polymerization of the raw material (I) cellulose.

Step 2

In Step 2, the cellulose-containing raw material (II) obtained in Step 1 is added by a basic compound with the amount thereof being in the range of 0.6 to 1.5 mol relative to 1 mol of AGU that constitutes the cellulose in the cellulose-containing raw material (II) (hereinafter, this unit is sometimes referred to as "AGU of the raw material (II) cellulose") as well as by water with the amount thereof being in the range of 20 to 100% by mass relative to the said cellulose thereby obtaining an alkali cellulose.

Basic Compound:

Illustrative example of the basic compound used in Step 2 includes alkaline metal hydroxides such as sodium hydroxide, potassium hydroxide, and lithium hydroxide; alkaline earth metal hydroxides such as magnesium hydroxide and calcium hydroxide; and tertiary amines such as trimethyl amine and triethyl amine. Among them, alkaline metal hydroxides or alkaline earth metal hydroxides are preferable; alkaline metal hydroxides are more preferable; and sodium hydroxide and potassium hydroxide are still more preferable. These basic compounds may be used solely or in a combination of two or more kinds of them.

Amount of the basic compound to be added in Step 2 is in the range of 0.6 to 1.5 mol relative to 1 mol of AGU of the raw material (II) cellulose. When adding amount of the basic compound is 0.6 or more by mol relative to 1 mol of AGU of the raw material (II) cellulose, the alkali cellulose can be produced in high yield, and a mixture containing the alkali cellulose having high conversion index to the alkali cellulose can be produced (this index will be explained later). Because of this, amount of the basic compound during the pulverization is preferably 0.7 or more by mol, or more preferably 0.8 or more by mol, relative to 1 mol of the AGU of the raw material cellulose. When adding amount of the basic compound is 1.5 or less by mol relative to 1 mol of AGU of the raw material (II) cellulose, the yield of the reaction (based on an etherification agent) during the later-mentioned reaction between the alkali cellulose and an etherification agent (hereinafter this reaction is sometimes referred to as "etherification reaction") is high; and in addition, amount of the formed salt is small even if neutralization is done after completion of the reaction, so that a purification step may be omitted, or the purification load may be reduced even if purification is done. From this view point, amount of the basic compound during pulverization is preferably 1.3 or less by mol, or more preferably 1.2 or less by mol, relative to 1 mol of AGU of the raw material cellulose. From the view point as mentioned above, amount of the basic compound to be added is preferably in the range of 0.7 to 1.3 mol, or more preferably in the range of 0.8 to 1.2 mol, relative to 1 mol of AGU of the raw material (II) cellulose.

The method to add the basic compound is not particularly restricted; and thus, it may be added either all at once or by a split addition. In the case that the basic compound is added all at once, in order to uniformly disperse the basic compound into the cellulose-containing raw material (II), it is preferable to add the basic compound into the cellulose-containing raw material (II) or into a mixture of water and the cellulose-containing raw material (II) followed by stirring and mixing the resulting mixture, or to add and mix the basic compound into the cellulose-containing raw material (II) or into a mixture of water and the cellulose-containing raw material (II) while they are being stirred.

The apparatus in which stirring and mixing are carried out is not particularly restricted so far as the basic compound can be dispersed into the cellulose-containing raw material (II). Illustrative example of the apparatus includes a ribbon-type mixer, a puddle-type mixer, and a conical planetary screw-type mixer; and a kneader to knead powders, a highly viscous substance, a resin, and so forth. Among them, a puddle mixer of a horizontal axis type is preferable; specifically Loedige Mixer, which is a puddle mixer of a horizontal axis type having a chopper blade (this is a mixer having a characteristic plough-shaped shovel which may be attached with a chopper blade), and a ploughshare mixer (this is a mixer having two functions, i.e., float dispersion mixing by a shovel blade having a unique shape and high speed shear dispersion by multi-stage chopper blades) are especially preferable.

Form of the basic compound during the time of addition of the basic compound is not particularly restricted; but in the case that the basic compound is added in the solid state, the basic compound is more preferably in the powder form in order to uniformly disperse the basic compound into the cellulose-containing raw material (II).

In the case that the basic compound is in the powder form, the median diameter thereof is preferably in the range of 10 to 150 μm, more preferably in the range of 20 to 100 μm, or still more preferably in the range of 50 to 80 μm.

The median diameter of the basic compound in the powder form may be measured by the method described in EXAMPLES.

As to the basic compound in the powder form, a commercially available basic compound in the powder form having the foregoing median diameter may be used as it is, or a basic compound in the pellet form having the median diameter thereof adjusted within the foregoing range by pulverizing with a heretofore known method may be used.

Water:

Amount of water to be added in Step 2 is in the range of 20 to 100% by mass relative to the raw material (II) cellulose.

When amount of water to be added is 20% or more by mass relative to the raw material (II) cellulose, the alkali cellulose can be produced in a high yield; and thus, a mixture containing the alkali cellulose having a high conversion index to the alkali cellulose can be produced (this index will be mentioned later). From this view point, amount of water to be added in Step 2 is preferably 25% or more by mass, or more preferably 30% or more by mass. On the other hand, when amount of water to be added is 100% or less by mass relative to the raw material (II) cellulose, a cellulose ether can be obtained in a high yield (based on an etherification agent) by an etherification reaction. From this view point, amount of water to be added in Step 2 is preferably 70% or less by mass, more preferably 60% or less by mass, or still more preferably 50% or less by mass. In view of the yield in the etherification reaction and in order to enhance the conversion index to the alkali cellulose, amount of water to be added is preferably in the range of 25 to 70% by mass, more preferably in the range of 30 to 60% by mass, or still more preferably in the range of 30 to 50% by mass, relative to the raw material (II) cellulose.

In order to uniformly disperse water into the cellulose-containing raw material (II), it is preferable (1) to add water into the cellulose-containing raw material (II) or into a mixture of the basic compound and the cellulose-containing raw material (II) followed by stirring and mixing the resulting mixture, or (2) to add and mix water into the cellulose-containing raw material (II) or into a mixture of the basic compound and the cellulose-containing raw material (II) while they are being stirred.

The apparatus to carry out the stirring and mixing is not particularly restricted so far as the apparatus can mix water with the cellulose-containing raw material (II). Specific examples thereof are the same as those described in the paragraphs for stirring and mixing of the basic compound.

As to the method for addition of water, there is no particular restriction; and thus, water may be added either all at once or by a split addition. Water is added preferably by spraying.

Order of addition of the basic compound and water is not restricted; and thus, any of the following methods may be used: (i) water is added after addition of the basic compound; (ii) the basic compound is added after addition of water; (iii) the basic compound and water are added at the same time; (iv) the basic compound is dissolved in water, and then added as the form of an aqueous solution. Among these methods, in view of the rate of production of the alkali cellulose, any of (i) to (iii) is preferable, or the method of (i) is more preferable. In view of the operation for production, the method of (iv) is preferable. In the case of the method of (iv), water to be used for dissolution of the basic compound may be entirety of the water to be added in Step 2 or a part thereof. In the case that water to be used for dissolution of the basic compound is a part of the water to be added in Step 2, the aqueous basic compound solution and the rest of water may be added by any order, or they may be added simultaneously.

Aging:

In the present invention, in order to facilitate the rate of production of the alkali cellulose, it is preferable to carry out aging after addition of the basic compound and water to the cellulose-containing raw material (II). In the present invention, aging means that the cellulose-containing raw material (II) after addition of the basic compound and water is allowed to stand at a certain temperature for a prescribed period of time with or without stirring.

Temperature for aging is preferably 35° C. or higher, more preferably 38° C. or higher, still more preferably 40° C. or higher, or further still more preferably 50° C. or higher, in view of the rate of production of the alkali cellulose. On the other hand, temperature for aging is preferably 90° C. or lower, more preferably 80° C. or lower, still more preferably 75° C. or lower, or further still more preferably 70° C. or lower, in order to suppress the decrease in the degree of polymerization of the alkali cellulose. In view of the rate of production of the alkali cellulose as well as in order to keep the degree of polymerization, temperature for aging is preferably in the range of 35 to 90° C., more preferably in the range of 38 to 80° C., still more preferably in the range of 40 to 75° C., or further still more preferably in the range of 50 to 70° C.

As to the apparatus for aging, there is no particular restriction. Specific examples thereof are the same as those described in the paragraphs for stirring and mixing of the basic compound. In view of convenient operation, aging is preferably carried out in the same apparatus as the apparatus in which the basic compound and water are added to the cellulose-containing raw material (II) followed by stirring and mixing the resulting mixture.

Time for aging may be changed appropriately in accordance with the rate of converting to the alkali cellulose, because this rate changes depending on the temperature for aging, crystallinity of the raw material (II) cellulose, and so forth. Usually, increase in the conversion index to the alkali cellulose reaches saturation within 24 hours even at room temperature. Accordingly, in view of the productivity, time for aging, if it is carried out, is usually 24 or less hours, preferably 12 or less hours, more preferably 6 or less hours, or still more preferably 3 or less hours. In order to produce the alkali cellulose in the powder form having a high conversion index to the alkali cellulose in high yield (this index will be mentioned later), time for aging, if it is carried out, is 0.1 or more hours, preferably 0.2 or more hours, more preferably 0.5 or more hours, or still more preferably 1 or more hours. In view of the above, time for aging, if it is carried out, is usually in the range of 0.1 to 24 hours; and in view of the productivity as well as in order to adequately convert to the alkali cellulose, the time is preferably in the range of 0.2 to 12 hours, more preferably in the range of 0.5 to 6 hours, or still more preferably in the range of 1 to 3 hours.

Addition of the basic compound, addition of water, and aging as mentioned above are carried out preferably under an atmosphere of an inert gas such as nitrogen if necessary in order to avoid coloration of the alkali cellulose to be produced and to avoid decrease in the degree of polymerization of the raw material (II) cellulose as well as the alkali cellulose to be produced.

Alkali Cellulose:

In the above-mentioned Step 2, a mixture containing the alkali cellulose is obtained; and this mixture may be used, without or with performing purification as necessary by a heretofore known method, as a raw material for various cellulose derivatives to be obtained by the reaction with the alkali cellulose.

Conversion of the raw material (II) cellulose to the alkali cellulose in Step 2 may be observed by the X-ray crystal diffraction measurement.

In the mixture obtained after addition of the basic compound and water to the cellulose-containing raw material (II) (hereinafter, this mixture is sometimes referred to as "alkali cellulose mixture"), there exist the alkali cellulose and the raw material (II) cellulose not converted to the alkali cellulose. Accordingly, in the present invention, the ratio of the alkali cellulose to the raw material (II) cellulose is conveniently expressed by the conversion index to the alkali cellulose obtained by the following calculation equation (3) from the result of the X-ray crystal diffraction measurement of the alkali cellulose mixture.

Conversion index to alkali cellulose=$2.2805 \times \{I_{20.8}/(I_{20.8}+I_{22.6})\}-0.54052$ (3)

(In the equation, $I_{22.6}$ shows the diffraction intensity in the crystal lattice plane (002 plane) of the cellulose I-type crystal in the X-ray diffraction (diffraction angle $2\theta=22.6°$) of the raw material (II) cellulose, and $I_{20.8}$ shows the diffraction intensity of the alkali cellulose (diffraction angle $2\theta=20.8°$).)

The conversion index to the alkali cellulose of the alkali cellulose mixture is a number in the range of 0 to 1, wherein this index increases with increase of the ratio of the alkali cellulose.

According to the production method of the present invention, the alkali cellulose mixture having a high conversion index to the alkali cellulose can be obtained while suppressing the decrease in the degree of polymerization of the raw material (II) cellulose.

The higher the conversion index to the alkali cellulose is, the more the amount of the alkali cellulose is in the alkali cellulose mixture; and thus, the later-mentioned etherification reaction takes place uniformly. Accordingly, in the case that the conversion index to the alkali cellulose is high, for example when a hydrophilic etherification agent is used, sufficient amount of the hydrophilic ether group may be introduced; and as a result, solubility of the obtained cellulose ether to water becomes higher, so that amount of insoluble matters may become smaller.

Method for Producing the Cellulose Ether

The method for producing the cellulose ether according to the present invention is characterized in that the alkali cellulose obtained by the above-mentioned method of the present invention is reacted with an etherification agent. By choosing various etherification agents for the reaction, various cellulose ethers can be obtained efficiently.

Etherification Agent:

As to the etherification agent used in the present invention, various etherification agents that are the raw materials for heretofore known cellulose ethers may be used so far as the agent is a compound having a reactive site to react with the alkali cellulose so that the cellulose ether may be producible. As to the etherification agent like this, the etherification agent shown by the following general formula (I), which has, as the reactive site with the alkali cellulose, an epoxy group or a halogen atom, may be mentioned.

W—Y (I)

(In the formula, W represents an epoxy group or a halogen atom. Y represents a hydrogen atom or a hydrocarbon group having 1 to 18 carbon atoms optionally substituted by at least one substituent group selected from a group shown by the following general formula (II), a sulfo group, a hydroxyl group, a carboxy group, a cyano group, and an alkoxy group having 1 to 18 carbon atoms. However, this excludes the case that W is a halogen atom while Y is a hydrogen atom.)

[Chem. 1]

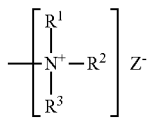

(II)

(In the formula, each of $R^1$ to $R^3$ independently represents a hydrocarbon group having 1 to 3 carbon atoms, and $Z^-$ represents an atom or a group having a monovalent negative charge.)

In the general formula (I), the hydrocarbon group of Y having 1 to 18 carbon atoms is preferably a linear or a branched aliphatic hydrocarbon group whose carbon number is preferably in the range of 1 to 10, more preferably in the range of 1 to 6, or still more preferably in the range of 1 to 3, in view of solubility of the cellulose ether obtained in the present invention into a polar solvent.

As to the alkoxy group of Y having 1 to 18 carbon atoms, an aliphatic alkoxy group having a linear or a branched hydrocarbon chain is preferable in view of solubility into the foregoing polar solvent.

The sulfo group and the carboxy group of Y is preferably a salt with an alkaline metal in view of storage stability of the etherification agent.

As to the hydrocarbon group having 1 to 3 carbon atoms of $R^1$ to $R^3$ in the general formula (II), a methyl group is particularly preferable in view of easy availability of the raw material thereof.

As to the $Z^-$ in the general formula (II), an inorganic ion such as a halogenated compound ion and organic ions such as an alkyl sulfate ion and an aliphatic acid ion may be mentioned, though a halogenated compound ion and an alkyl sulfate ion having 1 to 3 carbon atoms are preferable in view of the water solubility of the cellulose ether to be obtained in the present invention, while a halogenated compound ion is more preferable.

Illustrative example of the halogenated compound ion includes a chloride ion, a bromide ion, and an iodide ion; however, in view of chemical stability and easy availability, a chloride ion and a bromide ion are preferable, though a chloride ion is more preferable.

In the case that W is a halogen atom, in view of storage stability of the etherification agent, W is preferably chlorine or bromine, though W is more preferably chlorine.

Specific example of the etherification agent shown by the general formula (I) includes (i) an epoxy alkane, (ii) an alkyl glycidyl ether, (iii) a halogenated alkyl, (iv) an alkyl halohydrin ether, (v) a compound having a sulfo group and an epoxy group, (vi) a compound having a hydroxyl group and an epoxy group, (vii) a compound having a halogen atom and a carboxy group, (viii) a compound having a halohydrin group, (ix) a compound having a sulfo group and a halohydrin group, (x) a compound having a halohydrin group and a hydroxyl group other than the halohydrin group, (xi) a compound having a group shown by the general formula (II) and an epoxy group, (xii) a compound having a group shown by the general formula (II) and a halogen atom, and (xiii) a compound having a group shown by the general formula (II) and a halohydrin group.

Illustrative example of (i) the epoxy alkane includes epoxy alkanes having 2 to 20 carbon atoms such as ethylene oxide, propylene oxide, butylene oxide, 1,2-epoxy hexane, 1,2-epoxy octane, 1,2-epoxy decane, 1,2-epoxy dodecane, and 1,2-epoxy octadecane.

Illustrative example of (ii) the alkyl glycidyl ether includes alkyl glycidyl ethers which contain an alkyl group having 1 to 18 carbon atoms, such as methyl glycidyl ether, ethyl glycidyl ether, propyl glycidyl ether, n-pentyl glycidyl ether, isopentyl glycidyl ether, n-octyl glycidyl ether, 2-ethylhexyl glycidyl ether, n-decyl glycidyl ether, isodecyl glycidyl ether, lauryl glycidyl ether, cetyl glycidyl ether, stearyl glycidyl ether, and isostearyl glycidyl ether.

Illustrative example of (iii) the halogenated alkyl includes halogenated alkyls having 1 to 18 carbon atoms, such as methyl chloride, ethyl chloride, ethyl bromide, octyl chloride, and stearyl chloride.

Illustrative example of (iv) the alkyl halohydrin ether includes alkyl halohydrin ethers having 1 to 18 carbon atoms, such as 1-chloro-2-hydroxy-3-methoxypropane, 1-chloro-2-hydroxy-3-ethoxypropane, 1-chloro-2-hydroxy-3-propoxypropane, 1-chloro-2-hydroxy-3-butoxypropane, 1-chloro-2-hydroxy-3-octoxypropane, and 1-chloro-2-hydroxy-3-octadecyloxypropane.

Illustrative example of (v) the compound having a sulfo group and an epoxy group includes 1-sulfo-19,20-epoxy eicosane, 1-sulfo-9,10-epoxy decane, 1-sulfo-5,6-epoxy hexane, 1-sulfo-3,4-epoxy butane, glycidyl sulfonic acid, and a sodium or a potassium salt of them.

Illustrative example of (vi) the compound having a hydroxyl group and an epoxy group includes 1-hydroxy-19, 20-epoxy eicosane, 1-hydroxy-9,10-epoxy decane, 1-hydroxy-5,6-epoxy hexane, 1-hydroxy-3,4-epoxy butane, and glycidol.

Illustrative example of (vii) the compound having a halogen atom and a carboxy group includes chloroacetic acid, 3-chloropropionic acid, 4-chlorobutanoic acid, 8-chlorooctanoic acid, 18-chlorostearic acid, and a sodium or a potassium salt of them.

Illustrative example of (viii) the compound having a halohydrin group includes 2-chloroethanol, 1-chloro-2-hydroxypropane, 1-chloro-2-hydroxybutane, 1-chloro-2-hydroxyhexane, 1-chloro-2-hydroxyoctane, 1-chloro-2-hydroxydecane, 1-chloro-2-hydroxydodecane, and 1-chloro-2-hydroxyoctadecane.

Illustrative example of (ix) the compound having a sulfo group and a halohydrin group includes 1-chloro-2-hydroxy-3-sulfopropane, 1-chloro-2-hydroxy-4-sulfobutane, 1-chloro-2-hydroxy-6-sulfohexane, 1-chloro-2-hydroxy-12-sulfododecane, 1-chloro-2-hydroxy-18-sulfooctadecane, and a sodium or a potassium salt of them.

Illustrative example of (x) the compound having a halohydrin group and a hydroxyl group other than the halohydrin group includes 1-chloro-2,3-dihydroxypropane, 1-chloro-2,4-dihydroxybutane, and 1-chloro-2,18-dihydroxyoctadecane.

Illustrative example of (xi) the compound having a group shown by the general formula (II) and an epoxy group includes a chloride salt, a bromide salt, and a methylsulfate salt of 19,20-epoxyeicosane-1-trimethyl ammonium, 9,10-epoxydecane-1-trimethyl ammonium, 7,8-epoxyoctane-1-trimethyl ammonium, 5,6-epoxyhexane-1-trimethyl ammonium, 4,5-epoxypentane-1-trimethyl ammonium, 3,4-epoxybutane-1-trimethyl ammonium, glycidyl trimethyl ammonium, glycidyl triethyl ammonium, or glycidyl tripropyl ammonium.

Illustrative example of (xii) the compound having a group shown by the general formula (II) and a halogen atom includes a chloride salt, a bromide salt, and a methylsulfate salt of 1-chloro-methane-1-trimethyl ammonium, 1-chloroethane-2-trimethyl ammonium, 1-chloropropane-3-trimethyl ammonium, 1-chlorobutane-4-trimethyl ammonium, 1-chlorohexane-6-trimethyl ammonium, and 1-chlorooctadecane-18-trimethyl ammonium.

Illustrative example of (xiii) the compound having a group shown by the general formula (II) and a halohydrin group includes a chloride salt, a bromide salt, and a methylsulfate salt of 1-chloro-2-hydroxypropane-3-trimethyl ammonium, 1-chloro-2-hydroxybutane-4-trimethyl ammonium, 1-chloro-2-hydroxyoctane-8-trimethyl ammonium, and 1-chloro-2-hydroxyoctadecane-18-trimethyl ammonium.

Among them, in view of reactivity and easy availability, preferable are (i) an epoxy alkane, (ii) an alkyl glycidyl ether, (iii) a halogenated alkyl, (iv) an alkyl halohydrin ether, (v) a compound having a sulfo group and an epoxy group, (vi) a compound having a hydroxyl group and an epoxy group, (vii) a compound having a halogen atom and a carboxy group, (ix) a compound having a sulfo group and a halohydrin group, (xi) a compound having a group shown by the general formula (II) and an epoxy group, and (xiii) a compound having a group shown by the general formula (II) and a halohydrin group; more preferable are (i) an epoxy alkane, (v) a compound having a sulfo group and an epoxy group, (vi) a compound having a hydroxyl group and an epoxy group, (vii) a compound having a halogen atom and a carboxy group, (ix) a compound having a sulfo group and a halohydrin group, (xi) a compound having a group shown by the general formula (II) and an epoxy group, and (xiii) a compound having a group shown by the general formula (II) and a halohydrin group; still more preferable are (i) epoxy alkanes having 2 to 5 carbon atoms such as ethylene oxide and propylene oxide, (v) sodium glycidyl sulfonate salt, (vi) glycidol, (vii) chloroacetic acid and sodium chloroacetate salt, (ix) sodium 1-chloro-2-hydroxy-3-sulfopropane salt, (xi) glycidyl trimethyl ammonium chloride salt, and (xiii) 1-chloro-2-hydroxypropane-3-trimethyl ammonium chloride salt; and further still more preferable are ethylene oxide, propylene oxide, glycidol, chloroacetic acid, sodium chloroacetate salt, glycidyl trimethyl ammonium chloride salt, and 1-chloro-2-hydroxypropane-3-trimethyl ammonium chloride salt.

These etherification agents may be used solely or in a combination of two or more kinds of them.

Amount of the etherification agent to be used is not restricted; and thus, it may be adjusted appropriately in accordance with the yield of the reaction as well as the intended amount of the ether group to be introduced. If the introduced amount of the ether group of the cellulose ether obtained by the method of the present invention is 0.001 or more by mol relative to 1 mol of AGU that constitutes the cellulose ether main chain, a high water solubility may be obtained, while if the amount thereof is 50 or less by mol, the reaction takes place in the etherification reaction with a high yield (based on the etherification agent). From this view point, the use amount of the etherification agent is preferably in the range of 0.001 to 50 mol, more preferably in the range of 0.005 to 10 mol, still more preferably in the range of 0.01 to 5 mol, or further still more preferably in the range of 0.1 to 4 mol, relative to total 1 mol of AGU of the raw material (II) cellulose in the alkali cellulose mixture used as the raw material for the esterification and of AGU that constitutes the cellulose skeleton of the alkali cellulose (hereinafter, this total AGU is sometimes referred to as "AGU of the alkali cellulose mixture").

If the etherification agent has a halogen atom as the reaction site with the alkali cellulose of the present invention, a halogenated hydrogen is generated as the progress of the reaction thereby consuming the basic compound in the alkali cellulose mixture. Accordingly, in the case that the etherification agent has a halogen atom as the reaction site with the alkali cellulose of the present invention and that the mol number of the added etherification agent is more than the mol number of the basic compound added in Step 2, it is preferable to add a basic compound during the time of the etherification reaction. The amount of the basic compound to be added is preferably in the range of 50 to 150% by mol, more preferably in the range of 80 to 120% by mol, or still more preferably in the range of 90 to 110% by mol, relative to the difference of the mol number between the etherification agent and the basic compound added in Step 2.

Also, if the etherification agent has an acidic functional group such as a carboxylic group, the basic compound in the alkali cellulose mixture is consumed during addition of the etherification agent. Accordingly, also in the case that the etherification agent has an acidic functional group, it is preferable to add a basic compound during the time of the etherification reaction. The amount of the basic compound to be added is preferably in the range of 1 to 100% by mol, more preferably in the range of 10 to 99% by mol, or still more preferably in the range of 50 to 90% by mol, relative to the etherification agent.

Kind of the basic compound that can be added during the etherification reaction and preferable embodiments thereof are the same as the basic compounds and the preferable embodiments mentioned in the paragraphs regarding "Method for Producing the Alkali Cellulose". It is preferable to use the same basic compound as the basic compound used in production of the alkali cellulose.

Addition method of the etherification agent when it is added to the alkali cellulose mixture is not particularly restricted; and thus, the agent may be added all at once, by a split addition, continuously, or in a combination of them. From the view point to efficiently disperse the etherification agent into the alkali cellulose mixture, it is preferable that the etherification agent be added continuously or by a split addition while stirring the alkali cellulose mixture. The state of the etherification agent during its addition is not particularly restricted either. If the etherification agent is in the liquid state, it may be used as it is, or it may be used after it is diluted with a good solvent for the etherification agent such as water in order to improve handling thereof by reducing its viscosity and so forth.

Solvent:

The etherification reaction may be carried out also in the presence of a non-aqueous solvent in order to facilitate stirring of the mixture comprising the etherification agent and the alkali cellulose mixture. By carrying out the etherification reaction in the presence of a non-aqueous solvent, water solubility of the cellulose ether thereby obtained may be enhanced.

Illustrative example of the non-aqueous solvent includes a secondary or a tertiary lower alcohol having 3 to 4 carbon atoms such as isopropanol and tert-butanol that are generally used in the reaction of an alkali cellulose and an etherification agent; a ketone having 3 to 6 carbon atoms such as acetone, methyl ethyl ketone, and methyl isobutyl ketone; an ether such as tetrahydrofuran, 1,4-dioxane, ethylene glycol dimethyl ether, and diethylene glycol dimethyl ether; and a non-protonic polar solvent such as acetonitrile and dimethyl sulfoxide. Among them, in view of the reaction yield of the etherification reaction as well as the water solubility of the cellulose ether to be obtained, tert-butanol, isopropanol, tetrahydrofuran, ethylene glycol dimethyl ether, and acetonitrile are preferable; and in view of the safety of the non-aqueous solvent, tert-butanol, isopropanol, and ethylene glycol dimethyl ether are more preferable.

In view of water solubility of the cellulose ether to be obtained as well as productivity and reaction yield of the etherification agent, amount of these non-aqueous solvents to be used is preferably in the range of 1 to 100% by mass, more preferably in the range of 5 to 70% by mass, still more preferably in the range of 10 to 50% by mass, or particularly preferably in the range of 12 to 30% by mass, relative to the raw material (I) cellulose in Step 1.

The state during the time of the reaction of the alkali cellulose with the etherification agent is preferably the flowable powder state that is not a slurry state, a highly viscous state or an agglomerated state.

Reaction Apparatus:

Illustrative example of the apparatus for the etherification reaction includes a mixer such as a high speed mixer and a Loedige Mixer capable of stirring and mixing the alkali cellulose mixture and the etherification agent; and a so-called kneader used in kneading of powders, a highly viscous substance, a resin, and so on. In the case that the used etherification agent is in the gaseous state at the reaction temperature, apparatus for the etherification reaction is preferably a pressure-tight apparatus which is highly air tight and withstands the reaction under a pressurized condition.

Reaction Conditions:

Temperature during the etherification reaction may be appropriately adjusted in accordance with the reactivity of the etherification agent to be used and so forth; and thus, it is not particularly restricted. Temperature during the etherification reaction is preferably in the range of 0 to 200° C., more preferably in the range of 20 to 100° C., or still more preferably in the range of 30 to 80° C., in view of rate of the reaction as well as suppression of decomposition of the etherification agent or the alkali cellulose obtained by the production method of the present invention.

Time for the reaction may be appropriately adjusted in accordance with the reaction rate of the etherification agent, the intended amount of the ether group to be introduced, and the like. Time for the reaction is usually in the range of 0.1 to 72 hours; and in view of the reaction yield and the productivity of the etherification agent, it is preferably in the range of 0.2 to 36 hours, more preferably in the range of 0.5 to 18 hours, or still more preferably in the range of 1 to 12 hours.

Meanwhile, in order to avoid coloration and decrease in the degree of polymerization of the alkali cellulose of the present invention as well as of the cellulose ether to be obtained by the method of the present invention during the etherification reaction, the reaction is carried out preferably under an atmosphere of an inert gas such as nitrogen if necessary.

If the etherification agent is in the gaseous state under the reaction condition, the reaction is carried out preferably under the pressurized condition. The pressure may be adjusted appropriately by boiling point of the etherification agent and so forth. The pressure during the reaction is usually in the range of 0.001 to 10 MPa (gauge pressure); and in view of rate of the etherification reaction as well as burden to the apparatus, it is preferably in the range of 0.005 to 1 MPa (gauge pressure), or preferably in the range of 0.02 to 0.5 MPa (gauge pressure).

Post-treatment:

After completion of the etherification reaction, the cellulose ether may also be isolated by heretofore known purification operations such as neutralization of the basic compound by an acid as necessary, and washing by water-containing isopropanol, water-containing acetone, or the like.

Production of cationized hydroxyethyl cellulose, cationized hydroxypropyl cellulose, and so on:

In the method for producing the cellulose ether of the present invention, if ethylene oxide is used as the etherification agent to react with the alkali cellulose obtained in the above-mentioned method, hydroxyethyl cellulose can be produced efficiently. Alternatively, if propylene oxide is used as the etherification agent, hydroxypropyl cellulose can be produced efficiently.

In addition, if the obtained hydroxypropyl cellulose or hydroxyethyl cellulose is reacted with an etherification agent containing a cationic group such as glycidyl trimethyl ammonium chloride and 1-chloro-2-hydroxypropane-3-trimethyl ammonium chloride, a cationized hydroxypropyl cellulose or a cationized hydroxyethyl cellulose can be produced.

The reaction temperature, the reaction time, the reaction apparatus, and preferable embodiments of them in the reaction of the etherification agent containing the foregoing cationic group with hydroxypropyl cellulose or hydroxyethyl cellulose are the same as the reaction temperature, the reaction time, the reaction apparatus, and the preferable embodiments of them in the before-mentioned etherification reaction.

As to the embodiments mentioned above, the present invention discloses the following production methods.

1. A method for producing an alkali cellulose comprising the following Step 1 and Step 2.

Step 1: A cellulose-containing raw material (I) is treated by a pulverizing machine thereby obtaining a cellulose-containing raw material (II) which contains a cellulose with the crystallinity thereof being 10% or more and 55% or less.

Step 2: The cellulose-containing raw material (II) obtained in Step 1 is added by a basic compound with the amount thereof being 0.6 or more by mol and 1.5 or less by mol relative to 1 mol of an anhydroglucose unit that constitutes the said cellulose as well as by water with the amount thereof being 20% or more by mass and 100% or less by mass relative to the said cellulose thereby obtaining an alkali cellulose.

2. The method for producing the alkali cellulose according to 1, wherein crystallinity of the cellulose in the cellulose-containing raw material (II) after the treatment by a pulverizing machine in Step 1 is 11% or more, preferably 12% or more, or more preferably 15% or more, and 52% or less, more preferably 50% or less, more preferably 40% or less, or still more preferably 30% or less.

3. The method for producing the alkali cellulose according to 1 or 2, wherein the basic compound in Step 2 is one or more basic compounds selected from the group consisting of an alkaline metal hydroxide, an alkaline earth metal hydroxide, and an tertiary amine; preferably one or more basic compounds selected from the group consisting of an alkaline metal hydroxide and an alkaline earth metal hydroxide; more preferably one or more basic compounds selected from the group consisting of an alkaline metal hydroxide; or still more preferably one or more basic compounds selected from the group consisting of sodium hydroxide and potassium hydroxide.

4. The method for producing the alkali cellulose according to any of 1 to 3, wherein amount of the basic compound to be added in Step 2 is 0.7 or more by mol, or preferably 0.8 or more by mol, and 1.3 or less by mol, or preferably 1.2 or less by mol, relative to 1 mol of the anhydroglucose unit that constitutes the cellulose in the cellulose-containing raw material (II).

5. The method for producing the alkali cellulose according to any of 1 to 4, wherein amount of water to be added in Step 2 is 25% or more by mass, or preferably 30% or more by mass, and 70% or less by mass, preferably 60% or less by mass, or more preferably 50% or less by mass, relative to the cellulose in the cellulose-containing raw material (II).

6. The method for producing the alkali cellulose according to any of 1 to 5, wherein aging is carried out at 35° C. or higher and 90° C. or lower and for 0.1 or more hours and for 24 or less hours after addition of the basic compound and water in Step 2.

7. The method for producing the alkali cellulose according to 6, wherein the aging is carried out at 38° C. or higher, preferably 40° C. or higher, or more preferably 50° C. or higher, and 80° C. or lower, preferably 75° C. or lower, or more preferably 70° C. or lower.

8. The method for producing the alkali cellulose according to 6 or 7, wherein time for the aging is 0.2 or more hours, preferably 0.5 or more hours, or more preferably 1 or more hours, and 12 or less hours, preferably 6 or less hours, or more preferably 3 or less hours.

9. The method for producing the alkali cellulose according to any of 1 to 8, wherein amount of water in the cellulose-containing raw material (I) in Step 1 is 0% or more by mass, preferably 0.01% or more by mass, more preferably 0.1% or more by mass, or still more preferably 0.5% or more by mass, and 10% or less by mass, preferably 7% or less by mass, or more preferably 5% or less by mass, relative to the said cellulose.

10. The method for producing the alkali cellulose according to any of 1 to 9, wherein the treatment by a pulverizing machine in Step 1 is carried out by using a pulverizing machine selected from the group consisting of a roll mill, a vertical roller mill, a vessel-driven medium mill, a medium-stirring mill, and a compressing shear mill; preferably a vessel-driven medium mill or a medium-stirring mill; more preferably a vessel-driven medium mill; still more preferably a vibrating ball mill, a vibrating rod mill, or a vibrating tube mill; and further still more preferably a vibrating rod mill.

11. The method for producing the alkali cellulose according to any of 1 to 10, wherein the average degree of polymerization of the cellulose in the cellulose-containing raw material (I) in Step 1 is 100 or more, preferably 200 or more, more preferably 500 or more, or still more preferably 1000 or more, and 10000 or less, preferably 5000 or less, more preferably 3000 or less, or still more preferably 2000 or less.

12. The method for producing the alkali cellulose according to any of 1 to 11, wherein crystallinity of the cellulose in the cellulose-containing raw material (I) in Step 1 is 10% or more, preferably 20% or more, more preferably 50% or more, or still more preferably 60% or more, and 95% or less, preferably 90%, or more preferably 80% or less.

13. A method for producing a cellulose ether by reacting the alkali cellulose produced by the production method according to any of 1 to 12 with an etherification agent, preferably with an etherification agent shown by the following general formula (I).

$$W—Y \quad (I)$$

(In the formula, W represents an epoxy group or a halogen atom; Y represents a hydrogen or a hydrocarbon group having 1 to 18 carbon atoms optionally substituted by at least one substituent group selected from a group shown by the following general formula (II), a sulfo group, a hydroxyl group, a carboxy group, a cyano group, and an alkoxy group having 1 to 18 carbon atoms. However, this excludes the case that W is a halogen atom while Y is a hydrogen atom.)

[Chem. 2]

(In the formula, each of $R^1$ to $R^3$ independently represents a hydrocarbon group having 1 to 3 carbon atoms, and $Z^-$ represents an atom or a group having a monovalent negative charge.)

14. The method for producing the cellulose ether according to 13, wherein the carbon number of the hydrocarbon group in Y of the general formula (I) is 1 or more and 10 or less, preferably 6 or less, or more preferably 3 or less.

15. The method for producing the cellulose ether according to 13 or 14, wherein the sulfo group and the carboxy group in Y of the general formula (I) are salts of an alkaline metal.

16. The method for producing the cellulose ether according to 13 or 14, wherein the hydrocarbon group of $R^1$ to $R^3$ in the general formula (II) is a methyl group.

17. The method for producing the cellulose ether according to any of 13 to 16, wherein W in the general formula (I) is an epoxy group, a chlorine atom, or a bromine atom.

18. The method for producing the cellulose ether according to 13, wherein the etherification agent shown by the general formula (I) is one or more etherification agents selected from the group consisting of an epoxy alkane, an alkyl glycidyl ether, a halogenated alkyl, an alkyl halohydrin ether, a compound having a sulfo group and an epoxy group, a compound having a hydroxyl group and an epoxy group, a compound having a halogen atom and a carboxy group, a compound having a sulfo group and a halohydrin group, a compound having a group shown by the general formula (II) and an epoxy group, and a compound having a group shown by the general formula (II) and a halohydrin group; preferably one or more etherification agents selected from the group consisting of an epoxy alkane, a compound having a sulfo group and an epoxy group, a compound having a hydroxyl group and an epoxy group, a compound having a halogen atom and a carboxy group, a compound having a sulfo group and a halohydrin group, a compound having a group shown by the general formula (II) and an epoxy group, and a compound having a group shown by the general formula (II) and a halohydrin group; more preferably one or more etherification agents selected from the group consisting of an epoxy alkane having 2 to 5 carbon atoms, sodium glycidyl sulfonate salt, glycidol, chloroacetic acid, sodium chloroacetate salt, sodium 1-chloro-2-hydroxy-3-sulfopropane salt, glycidyl trimethyl ammonium chloride salt, and 1-chloro-2-hydroxypropane-3-trimethyl ammonium chloride salt; and still more preferably one or more etherification agents selected from the group consisting of ethylene oxide, propylene oxide, glycidol, chloroacetic acid, sodium chloroacetate salt, glycidyl trimethyl ammonium chloride salt, and 1-chloro-2-hydroxypropane-3-trimethyl ammonium chloride salt.

19. The method for producing the cellulose ether according to any of 13 to 18, wherein the use amount of the etherification agent is 0.001 or more by mol, preferably 0.005 or more by mol, more preferably 0.01 or more by mol, or still more preferably 0.1 or more by mol, and 50 or less by mol, preferably 10 or less by mol, more preferably 5 or less by mol, or still more preferably 4 or less by mol, relative to total 1 mol of the anhydroglucose unit of the cellulose and of the anhydroglucose unit of the alkali cellulose in the mixture containing the alkali cellulose produced by the method according to any of 1 to 12.

20. The method for producing the cellulose ether according to any of 13 to 19, wherein the alkali cellulose and the esterification agent are reacted in the presence of a non-aqueous solvent the amount of which is 1% or more by mass and 100% or less by mass relative to the cellulose in the cellulose-containing raw material (I).

21. The method for producing the cellulose ether according to 20, wherein the non-aqueous solvent is one or more kinds selected from the group consisting of a secondary or a tertiary lower alcohol having 3 to 4 carbon atoms, a ketone having 3 to 6 carbon atoms, an ether, and a non-protonic polar solvent; preferably one or more kinds selected from the group consisting of tert-butanol, isopropanol, tetrahydrofuran, ethylene glycol dimethyl ether, and acetonitrile; more preferably one or more kinds selected from the group consisting of tert-butanol, isopropanol, and ethylene glycol dimethyl ether.

22. The method for producing the cellulose ether according to 20 or 21, wherein amount of the non-aqueous solvent to be used is 5% or more by mass, preferably 10% or more by mass, or more preferably 12% or more by mass, and 70% or less by mass, more preferably 50% or less by mass, or still more preferably 30% or less by mass, relative to the cellulose in the cellulose-containing raw material (I).

23. The method for producing the cellulose ether according to any of 13 to 22, wherein reaction temperature in the etherification reaction is 0° C. or higher, preferably 20° C. or higher, or more preferably 30° C. or higher, and 200° C. or lower, preferably 100° C. or lower, or more preferably 80° C. or lower.

24. The method for producing the cellulose ether according to any of 13 to 23, wherein reaction time in the esterification reaction is 0.1 or more hours, preferably 0.2 or more hours, more preferably 0.5 or more hours, or still more preferably 1 or more hours, and 72 or less hours, preferably 36 or less hours, more preferably 18 or less hours, or still more preferably 12 or less hours.

EXAMPLES

In the following Examples, except for crystallinity (%), "%" means "% by mass" unless it is explicitly stated otherwise. In these Examples, content of the α-cellulose was used as the content of the cellulose in the raw material pulp. Amount of the raw material (II) cellulose in Step 2, AGU amount in the raw material (II) cellulose, and AGU amount in the alkali cellulose in the etherification step were calculated from the content of the foregoing α-cellulose and the charge amounts in respective steps.

Details of the measurement methods used in the Examples are collectively shown below.

(1) Calculation of α-cellulose Content in the Raw Material Pulp

Content of the α-cellulose in the raw material pulp was calculated from the foregoing calculation equation (1) by using the analysis values (S18 @20° C. (ISO 692) and S10 @20° C. (ISO 692)).

Content of the α-cellulose in the pulp in the chip form after drying was calculated from the value obtained in the above measurement and amount of the removed water during drying.

(2) Calculation of Crystallinity

Crystallinity of the cellulose in the pulp in each Example and Comparative Example was calculated according to the foregoing calculation equation (2) by measuring the X-ray diffraction intensity of the respective pulps by using the Rigaku RINT 2500VC X-RAY diffractometer (manufactured by Rigaku Corp.) with the following conditions: X-ray source of Cu/Kα-radiation, tube voltage of 40 kV, tube currency of 120 mA, measurement range of 2θ=5 to 45°, and X-ray scanning speed of 10°/minute. The sample for the measurement was the pellet having the area of 320 mm² and the thickness of 1 mm prepared by compression.

(3) Measurement of Amount of Water

Measurement of amount of water in the pulp was done by using the infrared moisture determination balance FD-610 (trade name, manufactured by Kett Electric Laboratory, Co., Ltd.). Measurement was done at 120° C.; and the end point was obtained when the mass change rate during the period of 30 seconds became 0.1% or less. The measured value of the water amount was converted to "% by mass" relative to the raw material cellulose in the pulp; and this was taken as the amount of water.

(4) Measurement of the Median Diameter of Sodium Hydroxide in Powder Form

Into a mortar was charged 1 mL of liquid paraffin; and then, to this was added about 50 mg of sodium hydroxide in the powder form obtained in Production Example. After this was dispersed by stirring with a pestle, 0.1 mL was taken from the disperse solution thus obtained and then put between two tempax glasses (56 mm×3.5 mm×75 mm), and then it was fixed to a holder. The median diameter was measured by using the laser diffraction/scattering particle distribution analyzer measurement instrument LA-920 (trade name, manufactured by HORIBA Ltd.), wherein refractive index of 1.2 for sodium hydroxide (NaOH) was used.

(5) Calculation of Conversion Index to the Alkali Cellulose

Measurement of the intensity of the X-ray diffraction of the alkali cellulose mixture obtained in Step 2 of each Example or Comparative Example were done within 10 minutes after completion of Step 2; and then, the conversion index was calculated according to the before-mentioned calculation equation (3) by using this measurement result.

Procedures of the X-ray diffraction intensity measurement were the same as those described in the foregoing "(2) Calculation of crystallinity" except that the used sample was the alkali cellulose powder mixture in place of the pulp.

(6) Calculation of Introduction Amount of the Substitution Group (6-1) Calculation of Introduction Amount of the Substitution Group in the Cationized Hydroxypropyl Cellulose The average number of the cationic functional group introduced into the cationized hydroxypropyl cellulose obtained by the production method of the present invention (hereinafter this cellulose, i.e., the cellulose ether obtained by reacting a cellulose with propylene oxide and 3-chloro-2-hydroxypropyltrimethyl ammonium chloride, is sometimes referred to as "C-HPC") relative to the AGU that constitutes the cellulose skeleton which is the main chain of C-HPC (hereinafter, this average number is sometimes referred to as "substitution degree of the cationic group"), and the average number of the propyleneoxy group introduced into C-HPC relative to the AGU that constitutes the main chain of C-HPC (hereinafter, this average number is sometimes referred to as "substitution degree of the propyleneoxy group") were obtained from the values measured according to the method for analysis of the hydroxypropyl cellulose described in the Japanese Pharmacopoeia (15th revision) except that the measurement value of the chlorine element amount was obtained by the elemental analysis and that the subject of the analysis was not the hydroxypropyl cellulose but C-HPC.

Specifically, after the aqueous solution of C-HPC obtained in the respective Examples was purified by a dialysis membrane (molecular weight cut off of 1000), this aqueous solution was freeze-dried to obtain the purified C-HPC. The chlorine element amount (%) in the obtained C-HPC was measured by the elemental, and the amount of the cationic group (a (mol/g)) contained in the C-HPC unit mass was calculated from the following calculation equation (4) with the assumption that the number of the cationic group contained in the purified C-HPC is approximately equal to the number of the chloride ion which is the counter ion of the cationic group.

$$a(\text{mol/g}) = \text{chlorine content obtained by elemental}(\%)/(35.5 \times 100) \quad (4)$$

Then, amount of the hydroxypropoxy group (%) in the purified C-HPC was measured according to "the analysis method of the hydroxypropyl cellulose" described in the Japanese Pharmacopoeia (15th revision) except that the subject of the analysis was not the hydroxypropyl cellulose but the purified C-HPC. The amount of the hydroxypropoxy group (b (mol/g)) (equation weight of —OC$_3$H$_6$OH is 75.09) was calculated from the following calculation equation (5).

$$b(\text{mol/g}) = \text{hydroxypropoxy group content}(\%) \text{obtained by gas chromatography analysis}/(75.09 \times 100) \quad (5)$$

From the obtained a, b, and the following calculation equations (6) and (7), the substitution degree of the cationic group of C-CPC (k) and the substitution degree of the propyleneoxy group (m) were calculated.

$$a = k/(162 + k \times 151.5 + m \times 58) \quad (6)$$

$$b = m/(162 + k \times 151.5 + m \times 58) \quad (7)$$

(In the equations, k shows the substitution degree of the cationic group of C-HPC, and m shows the substitution degree of the propyleneoxy group.)

(6-2) Calculation of Substitution Degree of the Ethyleneoxy Group of the Hydroxyethyl Cellulose The average number of the ethyleneoxy group present in the hydroxyethyl cellulose obtained by the production method of the present invention (hereinafter this cellulose is sometimes referred to as "HEC") relative to the AGU that constitutes the cellulose skeleton which is the main chain of HEC (hereinafter, this average number is sometimes referred to as "substitution degree of the ethyleneoxy group") was obtained according to "the analysis method of the hydroxypropyl cellulose" described in the Japanese Pharmacopoeia (15th revision) except that the subject of the analysis was not the hydroxypropyl cellulose but HEC, that the calibration curve was obtained by using not propyl iodide but ethyl iodide, and that ethyl iodide was quantitatively analyzed in place of propyl iodide. The substitution degree was calculated from the content of the hydroxyethoxy group (%) in the purified HEC obtained.

(6-3) Calculation of Substitution Degree of the Carboxymethyl Group of the Carboxymethyl Cellulose The average number of the carboxymethyl group present in the carboxymethyl cellulose obtained by the production method of the present invention (hereinafter this cellulose is sometimes referred to as "CMC") relative to the AGU that constitutes the cellulose skeleton which is the main chain of CMC (hereinafter, this average number is sometimes referred to as "substitution degree of the carboxymethyl group") can be measured by the following method.

It is considered that all carboxymethyl groups present in CMC obtained in Examples of the present invention form the sodium salt thereof and that the by-produced salt formed by the reaction and the neutralization is removed by purification. Accordingly, the measured number of the sodium contained in CMC after purification and drying is considered to be the number of the carboxymethyl group; and thus, the substitution degree of the carboxymethyl group was calculated from this number.

Specifically, after a CMC sample after purification and drying was decomposed by the wet method with sulfuric acid-hydrogen peroxide by using the microwave wet-type aching apparatus A-300 (trade name, manufactured by Societe Prolabo), the Na content (%) was measured by the atomic absorption spectrometer Z-6100 (trade name, manufactured by Hitachi, Ltd.); and then, the substitution degree was calculated by the following equation (8).

$$\text{Substitution degree}(DS) = (162 \times \text{Na Content}(\%))/(2300 - 80 \times \text{Na Content}(\%)) \quad (8)$$

(In the equation (8), 162 shows the molecular weight of 1 mol of the anhydrous glucose; and 2300 shows the value obtained by multiplying the atomic weight of sodium by 100 so as to give the percentage. The value 80 shows the increase in the molecular weight by substituting the hydrogen of the cellulose hydroxyl group with the carboxymethyl group (sodium salt)).

(7) Measurement of Average Degree of Polymerization (Copper-Ammonia Method)

(7-1) Measurement of Viscosity-Average Degree of Polymerization of the Pulp

The viscosity-average degree of polymerization of the cellulose in the pulp in each Example and Comparative Example was measured by the method shown below.

(i) Preparation of the Measurement Solution:

Into a measuring flask (100 mL) were taken 0.5 g of cuprous chloride and 20 to 30 mL of 25% aqueous ammonia solution; and after complete dissolution, 1.0 g of cupric hydroxide was added, and then 25% aqueous ammonia solution was added to somewhere before reaching the marked line of the measuring flask. The resulting mixture was stirred for 30 to 40 minutes for complete dissolution. Thereafter, the precisely weighed pulp (this was dried at 105° C. and 20 kPa for 12 hours) was added, and then the foregoing aqueous ammonia solution was added to the marked line of the measuring flask. After the flask was stoppered so as not to be invaded with an air, it was stirred by a magnetic stirrer for 12 hours for dissolution. Measurement solutions having different concentrations of the pulp were prepared similarly to the above by changing the charge amount of the pulp in the range of 20 to 500 mg.

(ii) Measurement of Viscosity-Average Degree of Polymerization:

Measurement solution (copper-ammonia aqueous solution) obtained in the above-described (i) was charged into the Ubbelohde viscometer; and after it was allowed to stand statically in a constant temperature cabinet (20±0.1° C.) for 1 hour, the dropping rate of the liquid was measured. From the dropping time (t seconds) of the copper-ammonia solution having various pulp concentrations (g/dL) and the dropping time ($t_0$ seconds) of the copper-ammonia aqueous solution without addition of the pulp, reduced viscosity ($\eta_{sp}/c$) at each concentration was obtained by the following equation.

$$\eta_{sp}/c = (t/t_0 - 1)/c$$

(In the equation, c represents the pulp concentration (g/dL).)

Further, the reduced viscosity was extrapolated to c=0 to obtain the intrinsic viscosity [η] (dL/g), and the viscosity-average degree of polymerization ($DP_v$) was obtained from the following equation.

$$DP_v = 2000 \times [\eta]$$

(In the equation, 2000 is an intrinsic coefficient for the cellulose.)

(7-2) Measurement of Viscosity-Average Degree of Polymerization of the Alkali Cellulose and the Cellulose in the Alkali Cellulose Mixture The viscosity-average degree of polymerization of the alkali cellulose and the cellulose in the alkali cellulose-containing mixture obtained in each Example and Comparative Example was calculated by the procedure similar to that used in the foregoing (7-1) Measurement of viscosity-average degree of polymerization of the pulp after the alkali cellulose was converted to the purified cellulose by the method described below.

(iii) Method for Converting to the Purified Cellulose:

After 1 g of the alkali cellulose mixture obtained in each Example or Comparative Example was dispersed into 50 mL of water and then neutralized by acetic acid, a solid cellulose was obtained by the centrifugal solid-liquid separation at 3000 rpm (2000×g) for 1 minute. The operation that the obtained solid cellulose was dispersed into 50 mL of water followed by the centrifugal solid-liquid separation was repeated for three times; and further, the centrifugal solid-liquid separation was done by dispersing the solid cellulose into 50 mL of acetone. After the solid thereby obtained was dried under the reduced pressure of 20 kPa at 105° C. for 12 hours, the purified cellulose was obtained.

(7-3) Measurement of Viscosity-Average Degree of Polymerization of the Cellulose Ether (iv) Preparation of Measurement Solution:

The measurement solution was prepared in the similar manner to that in the foregoing (i) Preparation of measurement solution, except that precisely weighed C-HPC, HEC, or CMC was used in place of the precisely weighed pulp.

(v) Measurement of Viscosity-Average Degree of Polymerization:

The measurement was done in the similar manner to that in the foregoing (ii) Measurement of the viscosity-average degree of polymerization, except that the cellulose-converted concentration (g/dL) was used as the concentration of the measurement solution. Here, the cellulose-converted concentration ($C_{cell}$) means the mass (g) of the cellulose skeleton portion contained in 1 dL of the measurement solution, and it can be defined by the following calculation equation (9).

$$C_{cell} = u \times 162/(162 + k \times 151.5 + m \times 58 + p \times 44 + q \times 81) \quad (9)$$

(In the equation, u shows the mass (g) of C-HPC or HEC precisely weighed at the time of preparation of the measurement solution; k and m show the substitution degree of the cationic group and the substitution degree of the propyleneoxy group obtained by the calculation equations (6) and (7), respectively; p shows the substitution degree of the ethyleneoxy group; and q shows the substitution degree of the carboxymethyl group, wherein p=q=0 when C-HPC is measured, k=m=0 when HEC is measured, and k=m=p=0 when CMC is measured.)

(8) Measurement of Water Soluble Fraction of the Cellulose Ether

Into a 50-mL screw tube were weighed 49.5 g of ion-exchanged water and 0.5 g of purified C-HPC, purified HEC, or purified CMC; and then, the resulting mixture was stirred by a magnetic stirrer for 12 hours for dissolution. This solution was transferred to a 50-mL centrifugally depositing tube and then centrifugally separated at 3000 rpm (2000×g) for 20 minutes. The supernatant solution (5 mL) was dried under reduced pressure (105° C., for 3 hours) to obtain the mass of the solid portion; and the water soluble fraction was calculated from the following equation (10).

Water soluble fraction(%)=(mass of the solid portion (g)in 5 mL of the supernatant×10/sample mass)× 100    (10)

Production Example 1

Production of Sodium Hydroxide in the Powder Form

Sodium hydroxide in the granular form (trade name of Tosoh Pearl, average granule diameter of 0.7 mm, manufactured by Tosoh Corp.) was charged into Xtream Mill MX-1200XTM (total volume of 150 mL, manufactured by Waring Commercial Products, Inc.), and was subjected to the pulverization treatment at 20° C. with the rotation speed of 24000 rpm for 15 seconds to obtain sodium hydroxide in the powder form (median diameter of 74 μm).

Example 1

Production of Alkali Cellulose

Chipping Step:

Wooden pulp in the sheet form (Biofloc HV+(93% as the content of the α-cellulose and 7.0% as the water content), manufactured by Tembec Inc.) was changed to the chip form having the size of 3 to 5 mm square by cutting with the sheet pelletizer SGG-220 (manufactured by HORAI Co., Ltd.).

The obtained pulp in the chip form was dried in the vacuum dryer VO-320 (trade name, manufactured by Advantec Toyo Kaisha, Ltd.) at 20 kPa and 105° C. in the nitrogen stream for 2 hours to obtain the dried pulp in the chip form as the cellulose-containing raw material (I) having 1500 as the average degree of polymerization, 96.9% as the content of the α-cellulose, 68% as the crystallinity, and 3.1% as the water content (relative to the raw material (I) cellulose).

Step 1:

The dried pulp in the chip form (200 g) obtained as mentioned above (1500 as the average degree of polymerization, 96.9% as the content of the α-cellulose, 3.1% as the water content, and 68% as the crystallinity) was charged into the vibrating rod mill MB-1 (total volume of 3.5 liters with 13 rods made of SUS 304 having a circular cross section form with φ of 30 mm, the rod length of 218 mm, and the filling ratio of 57%, manufactured by Chuo Kakohki Co., Ltd.); and then, it was subjected to the treatment by a pulverizing machine for 8 minutes with the rotation number of 20 Hz, the vibration amplitude of 8 mm, and the temperature of 20 to 70° C. to obtain, as the cellulose-containing raw material (II), the pulp in the powder form having the crystallinity thereof lowered (1261 as the average degree of polymerization and 52% as the crystallinity).

Step 2:

The pulp in the powder form (1 g) obtained in Step 1 as the cellulose-containing raw material (II) was transferred to a mortar. To this were added 0.19 g of NaOH in the powder form obtained in Production Example 1 (this amount corresponds to 0.8 mol relative to 1 mol of AGU of the raw material (II) cellulose) and 0.35 g of water (this amount corresponds to 36% relative to the raw material (II) cellulose); thereafter, this mixture was mixed by using a pestle at room temperature for 1 minute and then transferred into the 50-mL screw tube No. 7 (trade name, manufactured by Maruemu Corp.). Then, the air inside the tube was replaced with nitrogen; and after the tube was stoppered, aging was carried out in a constant temperature bath at 60° C. for 3 hours.

The average degree of polymerization of the alkali cellulose and the cellulose in the obtained alkali cellulose mixture was 865, and the conversion index to the alkali cellulose was 0.78. The results are shown in Table 1.

Examples 2 to 11

Production of Alkali Cellulose

By using the dried pulp in the chip form obtained in the chipping step of Example 1, Step 1 and Step 2 were carried out. The same procedures as Step 1 and Step 2 in Example 1 were followed, except that in Step 1 the charge amount of the dried pulp in the chip form and the time for the treatment by a pulverizing machine, as well as in Step 2, the charge amount of NaOH in the powder form, the charge amount of water, and the aging time were changed as shown in Table 1. The results are shown in Table 1.

Examples 12

Production of Alkali Cellulose

The pulp in the powder form (1 g) obtained as the cellulose-containing raw material (II) in Step 1 of Example 4 was transferred to a mortar. To this was added 0.61 g of 39.5% aqueous NaOH solution (this NaOH amount corresponds to 1.0 mol relative to 1 mol of AGU of the raw material (II) cellulose, and this water amount corresponds to 38% relative to the raw material (II) cellulose); thereafter, this mixture was mixed by using a pestle at room temperature for 1 minute and then transferred into the 50-mL screw tube No. 7 (trade name, manufactured by Maruemu Corp.). Then, the air inside the tube was replaced with nitrogen; and after the tube was stoppered, aging was carried out in a constant temperature bath at 60° C. for 3 hours. The results are shown in Table 1.

Examples 13

Production of Alkali Cellulose

The pulp in the powder form obtained as the cellulose-containing raw material (II) in Step 1 of Example 4 was used to carry out Step 2. The same procedure as Step 2 of Example 12 was followed except that 1.02 g of 24.3% aqueous NaOH solution (this NaOH amount corresponds to 1.0 mol relative to 1 mol of AGU of the raw material (II) cellulose, and this water amount corresponds to 80% relative to the raw material (II) cellulose) was added in Step 2. The results are shown in Table 1.

Examples 14

Production of Alkali Cellulose

Step 1:
The dried pulp in the chip form (920 g) obtained as mentioned above (1500 as the average degree of polymerization, 96.9% as the content of the α-cellulose, 3.1% as the water content, and 68% as the crystallinity) was charged into the vibrating rod mill FV-10 (total volume of 35 liters with 63 rods made of SUS 304 having a circular cross section form with the rod diameter of 30 mm, the rod length of 510 mm, and the filling ratio of 70%, manufactured by Chuo Kakohki Co., Ltd.); and then, it was subjected to the treatment by a pulverizing machine for 10 minutes with the vibration amplitude of 8 mm, the rotation number of 20 Hz, and the temperature of 10 to 40° C. to obtain, as the cellulose-containing raw material (II), the pulp in the powder form having the crystallinity thereof lowered (1198 as the average degree of polymerization and 14% as the crystallinity).

Step 2:
The pulp in the powder form (1 g) obtained as the cellulose-containing raw material (II) in Step 1 was used to carry out Step 2. The same procedure as Step 2 of Example 12 was followed except that 0.51 g of 28.2% aqueous NaOH solution (this NaOH amount corresponds to 0.6 mol relative to 1 mol of AGU of the raw material (II) cellulose, and this water amount corresponds to 38% relative to the raw material (II) cellulose) was added in Step 2, and that the aging was carried out at 50° C. The results are shown in Table 1.

Examples 15

Production of Alkali Cellulose

The pulp in the powder form (1 g) obtained as the cellulose-containing raw material (II) in Step 1 of Example 8 was used to carry out Step 2. The same procedure as Step 2 of Example 8 was followed except that the aging was not carried out in Step 2. The results are shown in Table 1.

Comparative Examples 1

Production of Alkali Cellulose

The pulp in the powder form (1 g) obtained as the cellulose-containing raw material (II) in Step 1 of Example 5 was used to carry out Step 2. The same procedure as Step 2 of Example 5 was followed except that water was not added in Step 2. The results are shown in Table 1.

Comparative Examples 2

Production of Alkali Cellulose

The pulp in the powder form (1 g) obtained as the cellulose-containing raw material (II) in Step 1 of Example 5 was used to carry out Step 2. The same procedure as Example 12 was followed except that 1.69 g of 14.1% aqueous NaOH solution (this NaOH amount corresponds to 1.0 mol relative to 1 mol of AGU of the raw material (II) cellulose, and this water amount corresponds to 150% relative to the raw material (II) cellulose) was added in Step 2.

The average degree of polymerization of the alkali cellulose and the cellulose in the obtained alkali cellulose mixture was 790, and the conversion index to the alkali cellulose was 0.58. The results are shown in Table 1.

Comparative Examples 3

Production of Alkali Cellulose

The pulp in the powder form (1 g) obtained as the cellulose-containing raw material (II) in Step 1 of Example 7 was used to carry out Step 2. The same procedure as Example 7 was followed except that addition amount of NaOH in the powder form was changed to 0.12 g (this amount corresponds to 0.5 mol relative to 1 mol of AGU of the raw material (II) cellulose) in Step 2. The results are shown in Table 1.

Comparative Examples 4

Production of Alkali Cellulose

The pulp in the powder form (1 g) obtained as the cellulose-containing raw material (II) in Step 1 of Example 7 was used to carry out Step 2. The same procedure as Step 2 of Example 14 was followed except that 0.49 g of 24.6% aqueous NaOH solution (this NaOH amount corresponds to 0.5 mol relative to 1 mol of AGU of the raw material (II) cellulose, and this water amount corresponds to 38% relative to the raw material (II) cellulose) was used in Step 2. The results are shown in Table 1.

Comparative Examples 5

Production of Alkali Cellulose

Step 1:
The same procedure as Example 7 was followed in Step 1, except that the time for the treatment by a pulverizing machine was changed to 50 minutes. The crystallinity was 0%, and the average degree of polymerization of the obtained pulp in the powder form was 630.

Step 2:
The same procedure as Step 2 of Example 12 was followed by using 1 g of the pulp in the powder form obtained in Step 1. The results are shown in Table 1.

Comparative Examples 6

Production of Alkali Cellulose

Step 1:
The dried pulp in the chip form (10 g) obtained in the chipping step of Example 1 (1500 as the average degree of polymerization, 96.9% as the content of the α-cellulose, 3.1% as the water content, and 68% as the crystallinity) was charged into Xtream Mill MX-1200XTM (total volume of 150 mL, manufactured by Waring Commercial Products, Inc.); and then, this was subjected to the pulverization treatment at 20° C. with the rotation speed of 24000 rpm for 15 seconds to obtain the pulp in the powder form (1413 as the average degree of polymerization and 68% as the crystallinity).

Step 2:
The same procedure as Step 2 of Example 2, except that 1 g of the pulp in the powder form obtained in Step 1 was used, was followed. The average degree of polymerization of the alkali cellulose and the cellulose in the obtained alkali cellulose mixture obtained by aging was 1100, and the conversion index to the alkali cellulose was 0.37. The results are shown in Table 1.

TABLE 1

| | Step 1 | | | | | Step 2 | | | | | | | Alkali cellulose mixture | |
|---|---|---|---|---|---|---|---|---|---|---|---|---|---|---|
| | Treatment by pulverizing machine | | Pulp in powder form | | | NaOH | | | Water | | Aging | | | |
| | Apparatus | Charge amount of dried pulp in chip form (g) | Treatment time (min) | Crystallinity (%) | Average degree of polymerization | Form | Adding amount (g) | Adding amount (mol)*10 | Adding amount (g) | Adding amount (%)*11 | Temp (°C.) | Time (hr) | Average degree of polymerization*13 | Conversion index to alkali cellulose |
| Example 1 | Rod mill*1 | 200 | 8 | 52 | 1261 | Powder | 0.19 | 0.8 | 0.35 | 36 | 60 | 3 | 865 | 0.78 |
| Example 2 | Rod mill*1 | 200 | 8 | 52 | 1261 | Powder | 0.24 | 1.0 | 0.35 | 36 | 60 | 3 | 917 | 0.77 |
| Example 3 | Rod mill*1 | 200 | 8 | 52 | 1261 | Powder | 0.29 | 1.2 | 0.35 | 36 | 60 | 3 | 898 | 0.73 |
| Example 4 | Rod mill*1 | 200 | 24 | 29 | 1188 | Powder | 0.19 | 0.8 | 0.35 | 36 | 60 | 3 | 963 | 0.81 |
| Example 5 | Rod mill*1 | 200 | 24 | 29 | 1188 | Powder | 0.24 | 1.0 | 0.35 | 36 | 60 | 3 | 1017 | 0.86 |
| Example 6 | Rod mill*1 | 200 | 24 | 29 | 1188 | Powder | 0.29 | 1.2 | 0.35 | 36 | 60 | 1 | 960 | 0.85 |
| Example 7 | Rod mill*1 | 100 | 20 | 11 | 984 | Powder | 0.19 | 0.8 | 0.35 | 36 | 60 | 1 | 916 | 0.85 |
| Example 8 | Rod mill*1 | 100 | 20 | 11 | 984 | Powder | 0.24 | 1.0 | 0.35 | 36 | 60 | 1 | 847 | 0.89 |
| Example 9 | Rod mill*1 | 100 | 20 | 11 | 984 | Powder | 0.29 | 1.2 | 0.35 | 36 | 60 | 1 | 828 | 0.95 |
| Example 10 | Rod mill*1 | 100 | 20 | 11 | 984 | Powder | 0.36 | 1.5 | 0.35 | 36 | 60 | 1 | 794 | 0.93 |
| Example 11 | Rod mill*1 | 200 | 24 | 29 | 1188 | Powder | 0.24 | 1.0 | 0.35 | 36 | 60 | 3 | 885 | 0.84 |
| Example 12 | Rod mill*1 | 200 | 24 | 29 | 1188 | Solution*4 | 0.61 | 1.0 | — | (38)*12 | 60 | 3 | 918 | 0.80 |
| Example 13 | Rod mill*1 | 200 | 24 | 29 | 1188 | Solution*5 | 1.02 | 1.0 | — | (80)*12 | 60 | 3 | 919 | 1.00 |
| Example 14 | Rod mill*2 | 920 | 10 | 14 | 1198 | Solution*6 | 0.51 | 0.6 | — | (38)*12 | 50 | 3 | 896 | 0.72 |
| Example 15 | Rod mill*1 | 100 | 20 | 11 | 984 | Powder | 0.24 | 1.0 | 0.35 | 36 | 60 | 3 | 916 | 0.84 |
| Comparative Example 1 | Rod mill*1 | 200 | 24 | 29 | 1188 | Powder | 0.24 | 1.0 | — | — | — | — | 1082 | 0.52 |
| Comparative Example 2 | Rod mill*1 | 200 | 24 | 29 | 1188 | Solution*7 | 1.69 | 1.0 | — | (150)*12 | 60 | 3 | 790 | 0.58 |
| Comparative Example 3 | Rod mill*1 | 100 | 20 | 11 | 984 | Powder | 0.12 | 0.5 | 0.35 | 36 | 60 | 6 | 543 | 0.52 |
| Comparative Example 4 | Rod mill*1 | 100 | 20 | 11 | 984 | Solution*8 | 0.49 | 0.5 | — | (38)*12 | 50 | 3 | 681 | 0.50 |
| Comparative Example 5 | Rod mill*1 | 100 | 50 | 0 | 630 | Solution*4 | 0.61 | 1.0 | — | (38)*12 | 60 | 3 | 451 | 0.94 |
| Comparative Example 6 | MX-1200*3 | 10 | 0.25 | 68 | 1413 | Powder | 0.24 | 1.0 | 0.35 | 36 | 60 | 3 | 1100 | 0.37 |

*1MB-1, manufactured by Chuo Kakohki Co., Ltd.
*2FV-10, manufactured by Chuo Kakohki Co., Ltd.
*3Xtream Mill MX-1200XTM, manufactured by Waring Commercial Products, Inc.
*4 39.5% aqueous NaOH solution
*5 24.3% aqueous NaOH solution
*6 28.2% aqueous NaOH solution
*7 14.1% aqueous NaOH solution
*8 24.6% aqueous NaOH solution
*10 Amount relative to 1 mol of AGU of the raw material (II) cellulose
*11 % by mass relative to the raw material (II) cellulose
*12 Water amount in the added aqueous NaOH solution (% by mass relative to the raw material (II) cellulose)
*13 Average degree of polymerization of the alkali cellulose and the cellulose in the alkali cellulose mixture From the results shown in Tables 1, according to the production method of the present invention, it can be seen that the decrease in the degree of polymerization from the raw material (I) cellulose can be suppressed, and that the alkali cellulose in the powder form having a high conversion index to the alkali cellulose can be obtained efficiently, even if the use amount of the basic compound is reduced.

Example 16

Production of Hydroxyethyl Cellulose

Step 1:

The dried pulp in the chip form (200 g) obtained in the chipping step of Example 1 (1500 as the average degree of polymerization, 96.9% as the content of the α-cellulose, 3.1% as the water content, and 68% as the crystallinity) was charged into the vibrating rod mill MB-1 (total volume of 3.5 liters with 13 rods made of SUS 304 having a circular cross section form with φ of 30 mm, the rod length of 218 mm, and the filling ratio of 57%, manufactured by Chuo Kakohki Co., Ltd.); and then, this was subjected to the treatment by a pulverizing machine for 24 minutes with the rotation number of 20 Hz, the vibration amplitude of 8 mm, and the temperature of 20 to 70° C. to obtain, as the cellulose-containing raw material (II), the pulp in the powder form having the crystallinity thereof lowered (1188 as the average degree of polymerization, 29% as the crystallinity, and 3.1% as the water content).

Step 2:

The pulp in the powder form (63 g) obtained as the cellulose-containing raw material (II) in Step 1 was transferred to a mortar. To this was added by spraying 37.5 g of 40.3% aqueous NaOH solution (this NaOH amount corresponds to 1.0 mol relative to 1 mol of AGU of the raw material (II) cellulose, and this water amount corresponds to 37% relative to the raw material (II) cellulose) for 5 minutes. After spraying, this mixture was stirred in the mortar for 1 minute to obtain an alkali cellulose mixture.

Reaction Step for Converting to Hydroxyethyl Ether:

The alkali cellulose mixture (100.5 g) obtained in Step 2 was taken into the pressure-tight ribbon mixer type reactor shown in FIG. 1 (volume of 1.1 liters, manufactured by Nitto Koatsu Co., Ltd.); and after the air therein was replaced with nitrogen, the temperature was raised to 40° C. with stirring. Then, 50 g of ethylene oxide (EO) was charged (this amount corresponds to 3.0 mol relative to 1 mol of AGU in the alkali cellulose mixture) for 5 hours while maintaining the pressure therein at 0.05 MPa (gauge pressure) to carry out the reaction thereby obtaining the crude hydroxyethyl cellulose (HEC).

This crude HEC (10.0 g) was taken and neutralized by acetic acid. To obtain the substitution degree of the ethyleneoxy group, the neutralized solution was purified by using a dialysis membrane (molecular weight cut off of 1000); and then, this aqueous solution was freeze-dried to obtain the purified HEC.

As the result of analysis, the substitution degree of the ethyleneoxy group was 2.4; and thus, the yield based on the added EO was 81%. The average degree of polymerization was 1013, and the water soluble fraction was 88%.

Comparative Example 7

Production of Hydroxyethyl Cellulose

Step 1:

The dried pulp in the chip form (200 g) obtained in the chipping step of Example 1 (1500 as the average degree of polymerization, 96.9% as the content of the α-cellulose, 3.1% as the water content, and 68% as the crystallinity) was charged into the vibrating rod mill MB-1 (total volume of 3.5 liters with 13 rods made of SUS 304 having a circular cross section form with φ of 30 mm, the rod length of 218 mm, and the filling ratio of 57%, manufactured by Chuo Kakohki Co., Ltd.); and then, it was subjected to the treatment by a pulverizing machine for 24 minutes with the rotation number of 20 Hz, the vibration amplitude of 8 mm, and the temperature of 20 to 70° C. to obtain, as the cellulose-containing raw material (II), the pulp in the powder form having the crystallinity thereof lowered (1155 as the average degree of polymerization, 18% as the crystallinity, and 3.0% as the water content).

Step 2:

The pulp in the powder form (63 g) obtained as the cellulose-containing raw material (II) in Step 1 was transferred to a mortar. To this was added by spraying 30.2 g of 25.0% aqueous NaOH solution (this NaOH amount corresponds to 0.5 mol relative to 1 mol of AGU of the raw material (II) cellulose, and this water amount corresponds to 37% relative to the raw material (II) cellulose) for 5 minutes. After spraying, this mixture was stirred in the mortar for 1 minute to obtain an alkali cellulose mixture.

Step of Converting Reaction to Hydroxyethyl Ether:

The alkali cellulose mixture (93.2 g) obtained in Step 2 was taken into the pressure-tight ribbon mixer type reactor shown in FIG. 1 (volume of 1.1 liters, manufactured by Nitto Koatsu Co., Ltd.); and after the air therein was replaced with nitrogen, the temperature was raised to 40° C. with stirring. Then, 50 g of ethylene oxide (EO) was charged (this amount corresponds to 3.0 mol relative to 1 mol of AGU in the alkali cellulose mixture) for 5 hours while maintaining the pressure therein at 0.05 MPa (gauge pressure) to carry out the reaction thereby obtaining the crude hydroxyethyl cellulose (HEC).

This crude HEC (10.0 g) was taken and neutralized by acetic acid. To obtain the substitution degree of the ethyleneoxy group, the neutralized solution was purified by using a dialysis membrane (molecular weight cut off of 1000); and then, this aqueous solution was freeze-dried to obtain the purified HEC.

As the result of analysis, the substitution degree of the ethyleneoxy group was 2.4; and thus, the yield based on the added EO was 78%. The average degree of polymerization was 1076, and the water soluble fraction was 55%.

Example 17

Production of Cationized Hydroxypropyl Cellulose

Chipping Step:

Wooden pulp in the sheet form (Biofloc HV+(1604 as the average degree of polymerization, 93.0% as the content of the α-cellulose, 74% as the crystallinity, and 7.0% as the water content), manufactured by Tembec Inc.) was changed to the chip form having the size of 3 to 5 mm square by cutting with the sheet pelletizer SGG-220 (manufactured by Horai Co., Ltd.).

The obtained pulp in the chip form was dried in the vacuum dryer VO-402 (trade name, manufactured by Advantec Toyo Kaisha, Ltd.) at 20 kPa and 105° C. in the nitrogen stream for 2 hours to obtain the dried pulp in the chip form (1604 as the average degree of polymerization, 99.2% as the content of the α-cellulose, 74% as the crystallinity, and 0.8% as the water content).

Step 1:

The dried pulp in the chip form (920 g) obtained as mentioned above was charged into the vibrating rod mill FV-10 (total volume of 35 liters with 63 rods made of SUS 304 having a circular cross section form with the rod diameter of 30 mm, the rod length of 510 mm, and the filling ratio of 70%, manufactured by Chuo Kakohki Co., Ltd.); and then, this was subjected to the treatment by a pulverizing machine for 10 minutes with the vibration amplitude of 8 mm, the rotation number of 20 Hz, and the temperature of 10 to 40° C. to obtain, as the cellulose-containing raw material (II), 920 g of the pulp in the powder form having the crystallinity thereof lowered (1198 as the average degree of polymerization, 14% as the crystallinity, and 1.0% as water content).

Step 2:

After 460 g of the pulp in the powder form obtained as the cellulose-containing raw material (II) in the foregoing Step 1 was charged into the Loedige Mixer (volume of 5 liters, manufactured by Matsubo Corp.), it was sprayed for 1.5 minutes with 266.8 g of 42.5% aqueous NaOH solution (this NaOH amount corresponds to 1.0 mol relative to 1 mol of AGU of the raw material (II) cellulose, and this water amount corresponds to 34% relative to the raw material (II) cellulose) while stirring the mixture at the stirring rate of 250 rpm for the main stirring blades and 2500 rpm for the chopper blades. After spraying, the inner temperature thereof was raised to 50° C.; and then, the aging was carried out for 3 hours with stirring to obtain an alkali cellulose mixture.

Etherification Step (Step of Converting Reaction to the Hydroxypropyl Cellulose):

The alkali cellulose mixture (720.5 g) obtained in Step 2 was heated to 50° C. in the Loedige Mixer mentioned above while stirring the mixture at the stirring rate of 50 rpm for the main stirring blades and 400 rpm for the chopper blades; and then, to this was gradually added 571.4 g of propylene oxide (this amount corresponds to 3.5 mol relative to 1 mol of AGU in the alkali cellulose mixture) for 3.5 hours. After completion of the gradual addition, aging was carried out at 50° C. for 2 hours.

Step of Etherification Reaction (Step of Cationization Reaction):

The reaction mixture (10.0 g) obtained in the converting reaction to the hydroxypropyl cellulose mentioned above was taken to a mortar; and then, to this were added 3.12 g of 65% aqueous solution of 3-chloro-2-hydroxypropyl trimethyl ammonium chloride solution (manufactured by Yokkaichi Chemical Co., Ltd.) (this amount corresponds to 0.5 mol relative to 1 mol of AGU that constitutes the cellulose skeleton of the compound having the cellulose skeleton in the reaction mixture obtained by the converting reaction to the hydroxypropyl cellulose) and 0.61 g of ion-exchanged water. After these were mixed for 5 minutes by a pestle, the resulting mixture was transferred to the 50-mL screw tube No. 7 (trade name, manufactured by Maruemu Corp.); and then, after the air therein was replaced with nitrogen followed by stoppering the tube, the aging was carried out in a constant temperature bath at 50° C. for 5 hours to obtain the crude C-HPC.

This crude C-HPC (10.0 g) was taken and neutralized by lactic acid. To obtain the substitution degrees of the propyleneoxy group, the neutralized solution was purified by using a dialysis membrane (molecular weight cut off of 1000); and then, this aqueous solution was freeze-dried to obtain the purified C-HPC.

The analysis results showed that the substitution degree of the propyleneoxy group of C-HPC was 2.0, the substitution degree of the cationic group was 0.17, the average degree of polymerization was 952, and the water soluble fraction of the purified C-HPC was 91.4%.

Example 18

Production of Cationized Hydroxypropyl Cellulose

Step 1:

The same procedure as Step 1 of Example 17 was followed to obtain the pulp in the powder form (II) (1198 as the average degree of polymerization, 14% as crystallinity, and 1.0% as the water content).

Step 2:

After 333 g of the pulp in the powder form obtained as the cellulose-containing raw material (II) in the foregoing Step 1 was charged into the Loedige Mixer (volume of 5 liters, manufactured by Matsubo Corp.), it was sprayed with 248.7 g of 33% aqueous NaOH solution (this NaOH amount corresponds to 1.0 mol relative to 1 mol of AGU of the raw material (II) cellulose, and this water amount corresponds to 50% relative to the raw material (II) cellulose) for 20 seconds while stirring the mixture at the stirring rate of 250 rpm for the main stirring blades and 2500 rpm for the chopper blades. After spraying, the inner temperature thereof was raised to 50° C.; and then, the aging was carried out for 2 hours with stirring to obtain the alkali cellulose mixture.

Etherification Step (Step of Converting Reaction to the Hydroxypropyl Cellulose):

Into the foregoing Loedige Mixer containing 581.7 g of the alkali cellulose mixture obtained in Step 2 was charged 50 g of isopropanol (this amount corresponds to 15% relative to the raw material cellulose (II)) as the non-aqueous solvent while stirring the mixture at 50 rpm for the main blades and 400 rpm for the chopper blades; and then, after it was stirred for 10 minutes, 393.9 g of propylene oxide was gradually added thereinto (this amount corresponds to 3.3 mol relative to 1 mol of AGU in the alkali cellulose mixture) for 3.5 hours. After completion of the gradual addition, aging was carried out at 50° C. for 2 hours. After completion of the reaction, isopropanol was removed by distillation under reduced pressure.

Step of Etherification Reaction (Step of Cationization Reaction):

The reaction mixture (10.0 g) obtained in the converting reaction to the hydroxypropyl cellulose mentioned above was taken to a mortar; and then, to this were added 3.53 g of 65% aqueous solution of 3-chloro-2-hdyroxypropyl trimethyl ammonium chloride solution (manufactured by Yokkaichi Chemical Co., Ltd.) (this amount corresponds to 0.5 mol relative to 1 mol of AGU that constitutes the cellulose skeleton of the compound having the cellulose skeleton in the reaction mixture obtained by the converting reaction to the hydroxypropyl) and 0.64 g of ion-exchanged water. After these were mixed for 5 minutes by a pestle, the resulting mixture was transferred to the 50-mL screw tube No. 7 (trade name, manufactured by Maruemu Corp.); and then, after the air therein was replaced with nitrogen followed by stoppering the tube, the aging was carried out in a constant temperature bath at 50° C. for 5 hours to obtain the crude C-HPC.

This crude C-HPC (10.0 g) was taken and neutralized by lactic acid. To obtain the substitution degrees of the propyleneoxy group, the neutralized solution was purified by using a dialysis membrane (molecular weight cut off of 1000); and then, this aqueous solution was freeze-dried to obtain the purified C-HPC.

The analysis results showed that the substitution degree of the propyleneoxy group of C-HPC was 1.9, the substitution degree of the cationic group was 0.24, the average degree of polymerization was 873, and the water soluble fraction of the purified C-HPC was 93.4%.

Example 19

Production of Carboxymethyl Cellulose

Step of Chipping:
Wooden pulp in the sheet form (Biofloc HV+ (1604 as the average degree of polymerization, 93.0% as the content of the α-cellulose, 74% as the crystallinity, and 7.0% as the water content), manufactured by Tembec Inc.) was changed to the chip form having the size of 3 to 5 mm square by cutting with the sheet pelletizer SGG-220 (manufactured by Horai Co., Ltd.).

The obtained pulp in the chip form was dried in the vacuum dryer VO-402 (trade name, manufactured by Advantec Toyo Kaisha, Ltd.) at 20 kPa and 105° C. in the nitrogen stream for 2 hours to obtain the dried pulp in the chip form (1604 as the average degree of polymerization, 99.2% as the content of the α-cellulose, 74% as the crystallinity, and 0.8% as the water content).

Step 1:
The dried pulp in the chip form obtained as mentioned above (920 g) was charged into the vibrating rod mill FV-10 (total volume of 35 liters with 63 rods made of SUS 304 having a circular cross section form with the rod diameter of 30 mm, the rod length of 510 mm, and the filling ratio of 70%, manufactured by Chuo Kakohki Co., Ltd.); and then, this was subjected to the treatment by a pulverizing machine for 10 minutes with the vibration amplitude of 8 mm, the rotation number of 20 Hz, and the temperature of 10 to 40° C. to obtain, as the cellulose-containing raw material (II), 920 g of the pulp in the powder form having the crystallinity thereof lowered (1198 as the average degree of polymerization, 14% as the crystallinity, and 1.0% as the water content).

Step 2:
After 100.0 g of the pulp in the powder form obtained as the cellulose-containing raw material (II) in the foregoing Step 1 was charged into a mortar, it was mixed with 96.9 g of 27.7% aqueous NaOH solution (this NaOH amount corresponds to 1.10 mol relative to 1 mol of AGU of the raw material (II) cellulose, and this water amount corresponds to 70% relative to the raw material (II) cellulose) for 5 minutes. The obtained mixture was charged into the kneader PNV-1 (trade name, volume of 1 liter, manufactured by Irie Shokai Co., Ltd.); and then, this was evacuated (about 50 kPa) and resumed to a normal pressure by nitrogen. This procedure of evacuation and resumption to a normal pressure by nitrogen was repeated for three times, so that the air therein was replaced by nitrogen. Thereafter, the temperature thereof was raised to 50° C.; and then, it was stirred for 3 hours for aging to obtain the alkali cellulose mixture.

Step of Converting Reaction to the Carboxymethyl:
After the temperature inside the kneader was cooled to 25° C., 71.9 g of sodium monochloroacetic acid (this amount corresponds to 1.00 mol relative to 1 mol AGU in the alkali cellulose mixture) was added thereinto; and then, inside the kneader was evacuated (about 50 kPa) and resumed to a normal pressure by nitrogen. This procedure of evacuation and resumption to a normal pressure by nitrogen was repeated for three times, so that the air therein was replaced by nitrogen. Thereafter, the temperature thereof was raised to 60° C.; and then, it was stirred for 3 hours. After 98% or more of the added monochloroacetic acid was confirmed to be consumed by HPLC, it was cooled to room temperature; and then, the product was taken out from the kneader. Then, after the product was dispersed into 1000 mL of 70% aqueous methanol, the excess sodium hydroxide was neutralized by adding 3.7 g of acetic acid. Then, to this was added 3000 mL of 70% aqueous methanol; and then, the resulting mixture was stirred to dissolve the by-produced salt, unreacted substances, and so on. The obtained slurry was filtrated by a filter paper (qualitative filter paper No. 2 (trade name), manufactured by Toyo Roshi Kaisha, Ltd., was used); and then, the cake after filtration was washed by 1000 mL of acetone and then dried under reduced pressure (about 70 kPa) at 60° C. in the nitrogen stream for 15 hours to obtain 128.3 g of CMC. The substitution degree of the carboxymethyl group in the obtained CMC was 0.68.

TABLE 2

| | Step 2 | | | | Etherification reaction | | | |
|---|---|---|---|---|---|---|---|---|
| | | | | Conversion | | | Etherification agent | |
| | Average degree of polymerization*1 | NaOH (mol)*2 | Water amount (%)*3 | index to alkali cellulose | Solvent | | | Charge amount |
| | | | | | Kind*5 | % by mass*4 | Reactant*5 | (mol)*6 |
| Example 16 | 1188 | 1.0 | 37 | 0.84 | — | | EO | 3.0 |
| Example 17 | 1198 | 1.0 | 34 | 0.85 | — | | PO/HAC | 3.5/0.5 |
| Example 18 | 1198 | 1.0 | 50 | 1.00 | IPA | 15 | PO/HAC | 3.3/0.5 |
| Example 19 | 1198 | 1.1 | 70 | 0.89 | — | | Na monochloro-acetate | 1.0 |
| Comparative Example 7 | 1155 | 0.5 | 37 | 0.50 | — | | EO | 3.0 |

TABLE 2-continued

|  | Cellulose ether | | | |
| --- | --- | --- | --- | --- |
|  | Substitution degree of ether group | Average degree of polymerization | Water soluble fraction (%) | Yield (%)*[7] |
| Example 16 | 2.4 | 1013 | 88 | 81 |
| Example 17 | 2.0/0.17 | 952 | 91.4 | 57/34*[8] |
| Example 18 | 1.9/0.24 | 873 | 93.4 | 57/48*[8] |
| Example 19 | 0.68 | 1163 | 99.8 | 68 |
| Comparative Example 7 | 2.4 | 1076 | 55 | 78 |

*[1]Average degree of polymerization of the cellulose-containing raw material (II)
*[2]Relative to 1 mol of AGU of the raw material (II) cellulose
*[3]% by mass relative to the raw material (II) cellulose
*[4]Amount relative to the raw material (II) cellulose
*[5]EO: ethylene oxide, PO: propylene oxide HAC: 1-chloro-2-hydroxypropane-3-trimethyl ammonium chloride salt IPA: isopropanol
*[6]Relative to 1 mol of AGU of the alkali cellulose mixture
*[7]Based on the added etherification agent
*[8]Yield based on the added PO/yield based on the added HAC The results of Examples 16 to 19 and Comparative Example 7 are shown in Table 2. From Table 2, it is clear that, according to the production method of the present invention, the cellulose ether with suppressed decrease in the degree of polymerization of the cellulose and with excellent water solubility in spite of reduced use amount of the basic compound can be obtained.

INDUSTRIAL APPLICABILITY

According to the production method of the present invention, an alkali cellulose and a cellulose ether having the decrease in the degree of polymerization during production thereof suppressed can be produced efficiently with high productivity. The cellulose ether thus obtained can be used as an ingredient for cleaning compositions such as a shampoo, a rinse, a treatment, and a conditioner; for cosmetic compositions such as a milky lotion and a cream; a softening composition for clothing; and so on. In addition, it can be used widely in the fields such as a polymer activating agent, a dispersing agent, an emulsifier, a modifier, a flocculant, and a viscosity controller.

EXPLANATION OF REFERENCE NUMERALS

1: Reactor
2: Stirring blades
3: Charging port of raw material
4: Charging port of ethylene oxide
5: Discharging port of ethylene oxide
6: Inlet port of heating medium
7: Outlet port of heating medium

The invention claimed is:

1. A method for producing an alkali cellulose comprising:
   Step 1 wherein a cellulose-containing raw material (I), having water content in the range of 0.01% to 10% by mass relative to the cellulose and being pulp, paper plant stem, or plant shells, is treated by a pulverizing machine thereby obtaining a cellulose-containing raw material (II) which contains a cellulose having crystallinity in the range of 10 to 55%,
   Step 2 wherein the cellulose-containing raw material (II) obtained in Step 1 is combined with:
   i) a basic compound with the amount thereof being in the range of 0.6 to 1.5 mol relative to 1 mol of an anhydroglucose unit that constitutes the said cellulose in the cellulose containing raw material (II) and
   ii) water in the range of 20 to 100% by mass relative to the said cellulose in the cellulose containing raw material (II), and
   Step 3 wherein aging is carried out by increasing the temperature range to 35 to 90° C. for the time period of 0.1 to 24 hours thereby obtaining an alkali cellulose.

2. The method for producing the alkali cellulose according to claim 1, wherein the water content in the cellulose-containing raw material (I) in Step 1 is in the range of 0.01% to 7% by mass relative to the cellulose.

3. The method for producing the alkali cellulose according to claim 1, wherein the basic compound is an alkaline metal hydroxide.

4. A method for producing a cellulose ether, further comprising the step wherein the alkali cellulose produced by the production method according to claim 1 is reacted with an etherification agent.

5. The method for producing the cellulose ether according to claim 4, wherein the alkali cellulose and the etherification agent are reacted in the presence of a non-aqueous solvent with the amount thereof being in the range of 1 to 100% by mass relative to the cellulose in the cellulose-containing raw material (I).

6. The method for producing the cellulose ether according to claim 4, wherein the etherification agent is one or more kinds selected from the group consisting of ethylene oxide, propylene oxide, glycidol, chloroacetic acid, sodium chloroacetate salt, glycidyl trimethyl ammonium chloride salt, and 1-chloro-2-hydroxypropane-3-trimethyl ammonium chloride salt.

7. A method for producing a cellulose ether, comprising:
   reacting the alkali cellulose produced by the production method according to claim 1 with an etherification agent,
   wherein use amount of the etherification agent is in the range of 0.001 to 50 mol relative to total 1 mol of the anhydroglucose unit of the cellulose and of the anhydroglucose unit of the alkali cellulose in the alkali cellulose-containing mixture produced by the production method according to claim 1.

8. The method for producing the cellulose ether according to claim 5, wherein the non-aqueous solvent is selected from the group consisting of a secondary or a tertiary lower alcohol having 3 to 4 carbon atoms, a ketone having 3 to 6 carbon atoms, an ether, a non-protonic polar solvent, and mixtures thereof.

9. The method for producing the alkali cellulose according to claim 1, wherein crystallinity of the cellulose in the cellulose-containing raw material (II) after the treatment by a pulverizing machine in Step 1 is 10-40%.

10. The method for producing the alkali cellulose according to claim 1, wherein the treatment by a pulverizing machine in Step 1 is carried out by using a pulverizing machine selected from the group consisting of a roll mill, a vertical roller mill, a vessel-driven medium mill, a medium-stirring mill, and a compressing shear mill.

11. The method for producing the alkali cellulose according to claim 1, wherein crystallinity of the cellulose in the cellulose-containing raw material (I) in Step 1 is 60% to 95%.

12. The method for producing the alkali cellulose according to claim 1, wherein amount of the basic compound to be added in Step 2 is 0.7-1.5 mol by mol, relative to 1 mol of the anhydroglucose unit that constitutes the cellulose in the cellulose-containing raw material (II).

13. The method for producing the alkali cellulose according to a claim 1, wherein the aging is carried out at 40-90° C.

14. The method for producing the alkali cellulose according to claim 1, wherein the aging is carried out at 35-75° C.

15. The method for producing the alkali cellulose according to claim 1, wherein the average degree of polymerization of the cellulose in the cellulose-containing raw material (I) in Step 1 is 100 to 10000.

* * * * *